United States Patent
Clark et al.

(10) Patent No.: US 10,078,933 B2
(45) Date of Patent: Sep. 18, 2018

(54) SEMI-AUTOMATED CANISTER DISTRIBUTION SYSTEM AND METHOD

(71) Applicant: Anytime Propane, LLC, Chickasha, OK (US)

(72) Inventors: James P. Clark, Chickasha, OK (US); Ivan Zhidov, Chickasha, OK (US); John Gearhart, Chickasha, OK (US)

(73) Assignee: Anytime Propane, LLC, Chickasha, OK (US)

( * ) Notice: Subject to any disclaimer, the term of this patent is extended or adjusted under 35 U.S.C. 154(b) by 0 days.

(21) Appl. No.: 15/630,701

(22) Filed: Jun. 22, 2017

(65) Prior Publication Data
US 2017/0372555 A1    Dec. 28, 2017

Related U.S. Application Data

(60) Provisional application No. 62/353,463, filed on Jun. 22, 2016.

(51) Int. Cl.
  *G07F 7/06* (2006.01)
  *G07F 11/62* (2006.01)
  (Continued)

(52) U.S. Cl.
  CPC .......... *G07F 11/62* (2013.01); *G06Q 20/208* (2013.01); *G07F 7/0609* (2013.01);
  (Continued)

(58) Field of Classification Search
  CPC ....... G07F 7/0609; G07F 11/62; G07F 11/002
  (Continued)

(56) References Cited

U.S. PATENT DOCUMENTS

| | | |
|---|---|---|
| 3,039,583 A | 6/1962 | Menefee |
| 3,179,224 A | 4/1965 | Haupt et al. |

(Continued)

FOREIGN PATENT DOCUMENTS

| | | |
|---|---|---|
| EP | 1 396 823 | 3/2004 |
| ES | 2 158 816 | 9/2001 |

(Continued)

OTHER PUBLICATIONS

Siraga Distrigas, Siraga Vending Machine Solutions Distrigas, YouTube, Mar. 26, 2012 [retrieved on Jan. 29, 2015] from the internet: https://youtu.be/6nMLC9II5iw.

(Continued)

*Primary Examiner* — Timothy R Waggoner
(74) *Attorney, Agent, or Firm* — Dunlap Codding, P.C.

(57) ABSTRACT

Methods and systems are disclosed including a semi-automated propane canister distribution system for distributing and exchanging propane canisters, comprising a system controller; one or more cabinet system having a cabinet controller and a cabinet with a first compartment separated from a second compartment, the first compartment having a first door and the second compartment having a second door, the first door and the second door having an open position and a closed position with a locked state and an unlocked state; a detection device; a remote display; and a remote controller device in communication with the system controller and/or the cabinet controller.

20 Claims, 14 Drawing Sheets

(51) Int. Cl.
  *G07F 11/00* (2006.01)
  *G06Q 20/20* (2012.01)
  *G07F 17/12* (2006.01)
  *G06Q 30/02* (2012.01)
  *G06Q 10/08* (2012.01)

(52) U.S. Cl.
  CPC ............ *G07F 11/002* (2013.01); *G07F 17/12* (2013.01); *G06Q 10/087* (2013.01); *G06Q 30/0208* (2013.01); *G06Q 30/0238* (2013.01)

(58) Field of Classification Search
  USPC .................................................. 700/231–244
  See application file for complete search history.

(56) References Cited

U.S. PATENT DOCUMENTS

| | | |
|---|---|---|
| 5,544,784 A | 8/1996 | Malaspina |
| 5,708,223 A | 1/1998 | Wyss |
| 5,829,630 A | 11/1998 | Fernald |
| 6,206,237 B1 | 3/2001 | Dillon et al. |
| 6,711,460 B1* | 3/2004 | Reese ................. G06F 19/3456 700/216 |
| 6,761,194 B1* | 7/2004 | Blong ................. F17C 13/084 141/98 |
| D545,373 S | 6/2007 | Steffens |
| 8,145,351 B2* | 3/2012 | Schininger ................ E05G 1/06 221/12 |
| 8,360,272 B2 | 1/2013 | Piersant |
| 8,387,823 B2 | 3/2013 | Davis et al. |
| 8,469,228 B2 | 6/2013 | Adams |
| 9,134,060 B2 | 9/2015 | Seymour |
| 9,275,508 B1* | 3/2016 | Lavra .................... G07F 11/005 |
| 9,390,575 B1* | 7/2016 | Clark ........................ G07F 5/26 |
| 9,852,573 B2* | 12/2017 | Chalise ................... G07F 11/62 |
| 2004/0245278 A1 | 12/2004 | Steffens et al. |
| 2007/0170201 A1 | 7/2007 | Steffens |
| 2008/0083769 A1 | 4/2008 | Yuyama et al. |
| 2008/0188980 A1* | 8/2008 | Home ................... G07F 7/0609 700/244 |
| 2009/0076650 A1* | 3/2009 | Faes ...................... G07F 11/165 700/232 |
| 2009/0084810 A1 | 4/2009 | Borzym |
| 2009/0145919 A1 | 6/2009 | Dueck et al. |
| 2012/0222938 A1 | 9/2012 | Rose et al. |
| 2016/0113416 A1 | 4/2016 | Huffar et al. |
| 2016/0113422 A1 | 4/2016 | Huffar et al. |

FOREIGN PATENT DOCUMENTS

| | | |
|---|---|---|
| FR | 2 888 380 | 1/2007 |
| GB | 2 251 609 | 7/1992 |
| WO | 2004/090357 | 10/2004 |
| WO | 2007/100400 | 9/2007 |
| WO | 2010/130913 | 11/2010 |
| WO | 2012/131132 | 4/2012 |
| WO | 2013/074915 | 5/2013 |

OTHER PUBLICATIONS

International Search Report and Written Opinion (PCT/US2014/067486); dated Feb. 20, 2015.
Kooler Ice, "IceTalk", retrieved from http://www.koolerice.com/icetalk/, last visited May 17, 2017.
Kooler Ice, "KI810 Ice and Water Vending Machine" Brochure, retrieved from http://www.koolerice.com/ki810-ice-vending-machine/, last visited May 17, 2017.

* cited by examiner

SEMI-AUTOMATED CANISTER DISTRIBUTION SYSTEM AND METHOD

INCORPORATION BY REFERENCE

The present patent application claims priority to, and hereby incorporates herein the entire contents of, the provisional patent application identified by Ser. No. 62/353,463, entitled "SEMI-AUTOMATED CANISTER DISTRIBUTION SYSTEM AND METHOD", filed Jun. 22, 2016.

FIELD OF THE DISCLOSURE

The present invention relates generally to the vending of canisters through semi-automated systems and has particular relevance to the sale and/or exchange of propane canisters or tanks.

BACKGROUND

Some products are delivered and sold in containers for use by customers. For example, propane is often sold in containers that are cylindrical canisters having valves, such as the type typically used for outdoor grills. These canisters typically have a cylindrically shaped tank, a base-mounted to the bottom of the tank, a valve at the top of the tank, and a guard substantially encircling the valve and providing a pair of lifting handles. The base and the guard typically have diameters smaller than the diameter of the outer surface of the tank. Because of the specific nature in which such canisters must be filled, the equipment needed to fill the tanks, and the highly combustible nature of propane, it is generally required that a professional fill a user's propane tank.

Accordingly, for propane and similar products, empty canisters are typically exchanged for full ones. Generally, when a canister is empty (i.e. substantially out of propane or other product), a user brings the substantially empty canister to a particular store and exchanges the empty canister for a full canister (i.e. full or substantially full of propane or other product). Or, the user may buy a substantially full canister without exchange of an empty canister. A cashier generally assists the user in accessing the full canister and/or ensuring that the user returns the empty canister and accesses a full canister.

The term "substantially" when used with the term "full" herein means the canister is full within a range of capacity of the canister to hold its contents within a safety margin for the canister and/or as set by the distributer or dealer, which may vary. Additionally, some canisters thought to be "empty" by a purchaser may still contain propane. The term "substantially empty" as used herein may describe a canister discerned as empty or desirable for exchange by a purchaser.

Typically, the user pays for the full canister first, and then the canister is distributed post-payment. This is different than the usual indoor retail environment, where goods are gathered first and then paid for by the customer.

The full and empty propane canisters may be kept in various secure locations (e.g. locked cage, etc.). Additionally, the propane canisters are generally also stored outside the store for various safety reasons. Storage of propane canisters is typically regulated by local, state, or federal government agencies, or under best-practice safety guidelines. For example, the use of electrical components that could cause a spark could be restricted near the stored propane. Such regulations may be promulgated by agencies and associations such as the federal Occupational Safety and Health Administration, the Compressed Gas Association, the National Fire Protection Association, the American Petroleum Institute, the International Electrotechnical Commission, and the Canadian Standards Association.

Exchanging and distributing the propane canisters can be burdensome for the businesses that sell the canisters in that the cashiers may have to leave the registers to help customers exchange the canisters or obtain full canisters. This can also result in customers waiting at the register unassisted or the businesses making an employee constantly available to exchange and distribute propane canister.

Additionally, if the cashier accepts payment and allows the customer to return and/or withdraw the canisters unsupervised, the customer may return or take the wrong number of canisters, causing inventory losses and/or discrepancies.

Fully automated systems are one answer to these problems. However, fully automated systems may be prohibitively expensive for some small businesses.

SUMMARY

Semi-automated canister distribution systems and methods are disclosed. The problems involved in the sale and distribution of canisters stored outside of places of business are addressed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
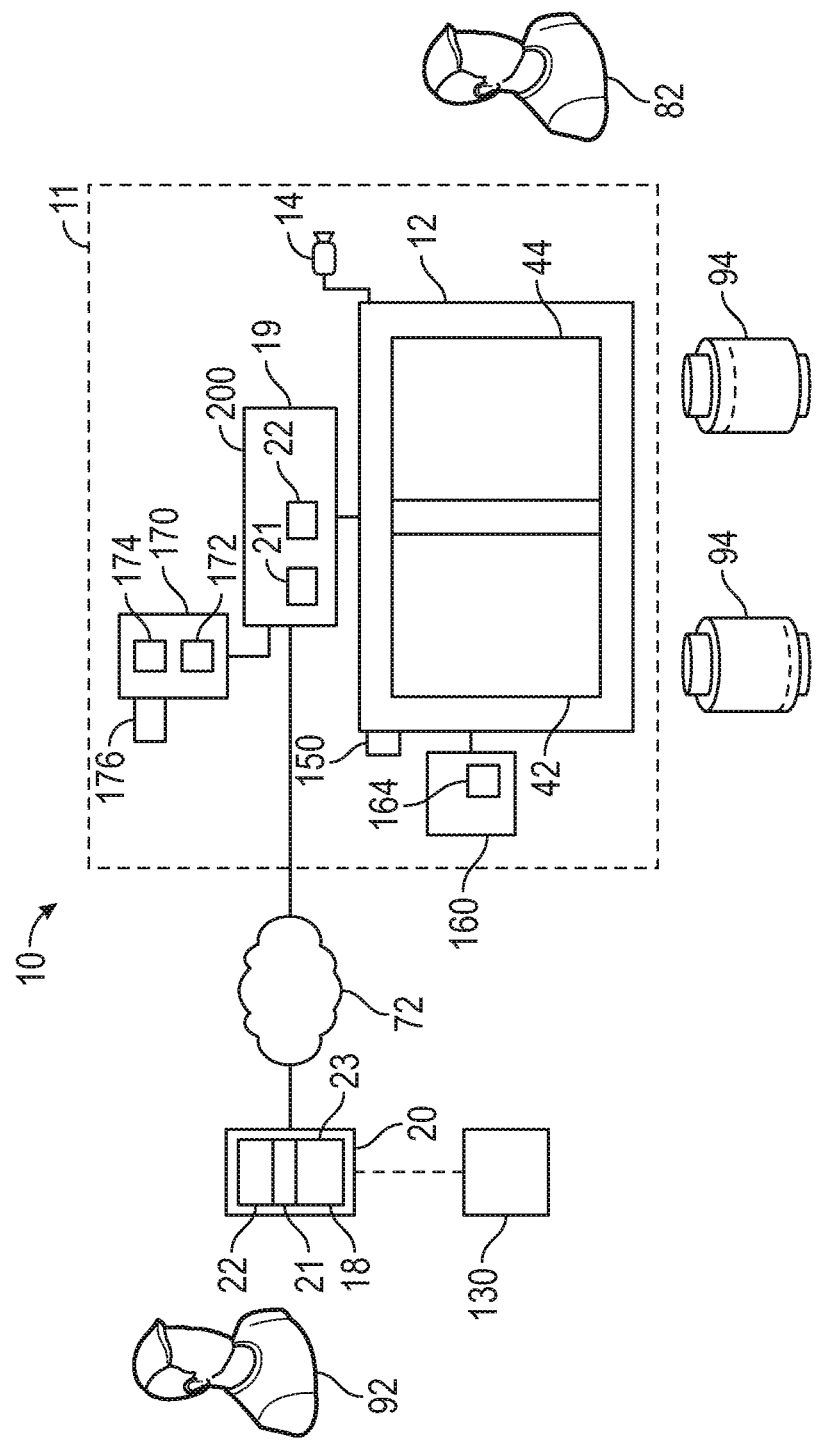
FIG. 1 is a schematic diagram of an exemplary embodiment of a semi-automated canister distribution system in accordance with the present disclosure

The following detailed description refers to the accompanying drawings. The same reference numbers in different drawings may identify the same or similar elements.

The mechanisms proposed in this disclosure circumvent at least the problems described above. The present disclosure describes methods and systems including one embodiment of a semi-automated canister distribution method comprising receiving, by a remote controller device located in a store, information indicative of a purchase transaction from a purchaser for a return of a first canister and pickup of a second canister, the second canister stored in a second compartment of a cabinet system located outside of the store, the second compartment separated from a first compartment of the cabinet system, the first compartment having a first door and the second compartment having a second door, the first and second door having an open position and a closed position with a locked state and an unlocked state; receiving, by the remote controller device, a signal indicative of the purchaser being located at the cabinet system; transmitting a signal, with the remote controller device, to the cabinet system to change the first door from the locked state to the unlocked state; and transmitting, from the cabinet system, a real-time visual feed from at least one unit detection device of the cabinet system to a remote display located in the store, the unit detection device positioned to have a field of view encompassing at least a portion of an interior of the cabinet system when the first door or the second door is in the open position; monitoring, by an operator of the remote display, the purchaser returning the first canister to the first compartment; transmitting a second signal, with the remote controller device, to the cabinet system to change the second door from the locked state to the unlocked state; and monitoring, using the remote display, the purchaser retrieving the second canister from the second compartment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between one or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIGS. 1-13, a semi-automated canister distribution system 10 is shown in accordance with the present disclosure. In one embodiment, the semi-automated canister distribution system 10 comprises a cabinet system 11, a remote display 18, and a remote controller device 20 in communication with the cabinet system 11 and the remote display 18. In one embodiment, the cabinet system 11 may further comprise one or more cabinet controller 19 in communication with one or more other components of the cabinet system 11, the remote controller device 20, and/or the remote display 18. In one embodiment, the cabinet system 11 may further comprise one or more system controller 200.

In one embodiment, the semi-automated canister distribution system 10a further comprises a system controller 200. The system controller 200 may comprise one or more computing device that executes system logic and manages and controls the cabinet systems 11 within the semi-automated canister distribution system 10 and communicates with the remote controller device 20 and/or the remote display 18.

In one embodiment, the cabinet controller 19 may share components with the system controller 200. In one embodiment, the cabinet controller 19 and the system controller 200 are physically located together. In one embodiment, the cabinet controller 19 and the system controller 200 are physically separate.

In one embodiment, the system controller 200 may communicate with the one or more cabinet systems 11, the cabinet controller 19, the remote controller device 20, and/or the remote display 18 through a wireless or wired network.

The system controller 200 may comprise one or more memories 22 and one more processors 21, which will be referred to hereinafter in the singular for purposes of clarity. The memory 22 and the processor 21 can be stand-alone, partially or completely network-based or cloud-based, and may be located in a single physical location or in multiple physical locations. For example, a portion of the memory 22 may be a cloud-based memory.

The processor 21 is capable of executing processor executable code stored on the memory 22 and/or or creating, manipulating, altering, and storing computer data structures into the memory 22. The processor 21 can be implemented as a single processor 21 or multiple processors 21 working together to execute the logic described herein. Exemplary embodiments of the processor 21 include a digital signal processor (DSP), a central processing unit (CPU), a field programmable gate array (FPGA), a microprocessor, a multi-core processor, and/or combinations thereof.

The memory 22 stores processor executable code for causing the processor 21 to implement functions described herein. The memory 22 may be implemented as any conventional non-transitory computer memory, such as random access memory (RAM), a CD-ROM, a hard drive, a solid state drive, a flash drive, a memory card, a DVD-ROM, a floppy disk, an optical non-transitory drive (such as a compact disc), a compact flash drive, holographic drives, and combinations thereof, for example.

In one embodiment, the cabinet system 11 comprises a cabinet 12 and at least one camera 14 having a field of view of at least a portion of an interior 16 of the cabinet 12 and/or at least a portion of an area in proximity to the cabinet 12. The camera 14 may be in communication with the cabinet controller 19, the remote display 18, and/or the remote controller device 20. The remote display 18 may receive and display a real-time visual feed from at least one camera 14 through the cabinet controller 19 and/or directly. In one embodiment, the cabinet system 11 may comprise one or more unit detection devices 162, non-exclusive examples of which include one or more or combinations of the following: one or more scales, one or more weight sensors, one or more proximity sensors, one or more computer vision devices (including camera(s) 14), one or more LiDAR (Light Detection And Ranging) devices, and/or one or more light barrier devices.

Figure 2:
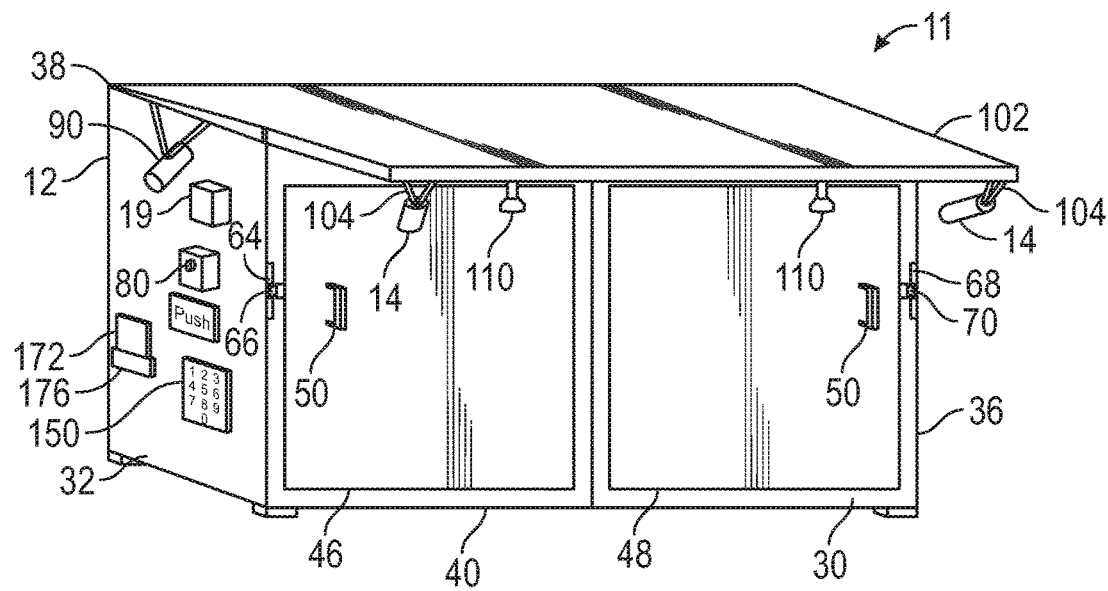
FIG. 2 is a perspective view of components of an exemplary embodiment of a semi-automated canister distribution system in accordance with the present disclosure.
Figure 3:
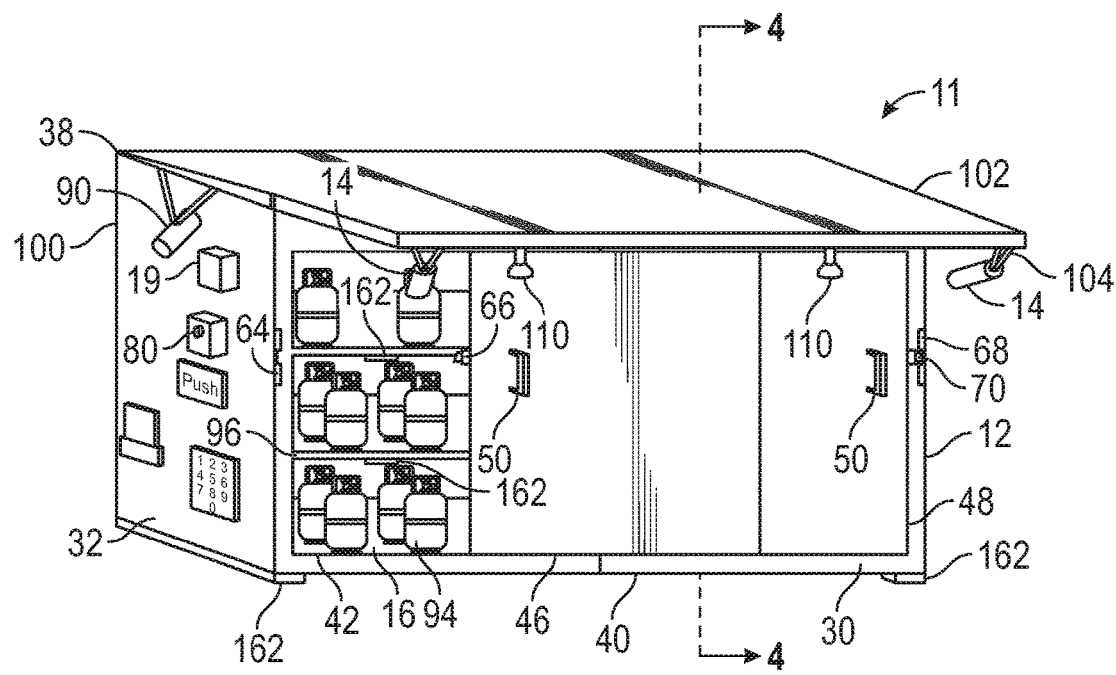
FIG. 3 is another perspective view of components of an exemplary embodiment of a semi-automated canister distribution system in accordance with the present disclosure.
Figure 4:
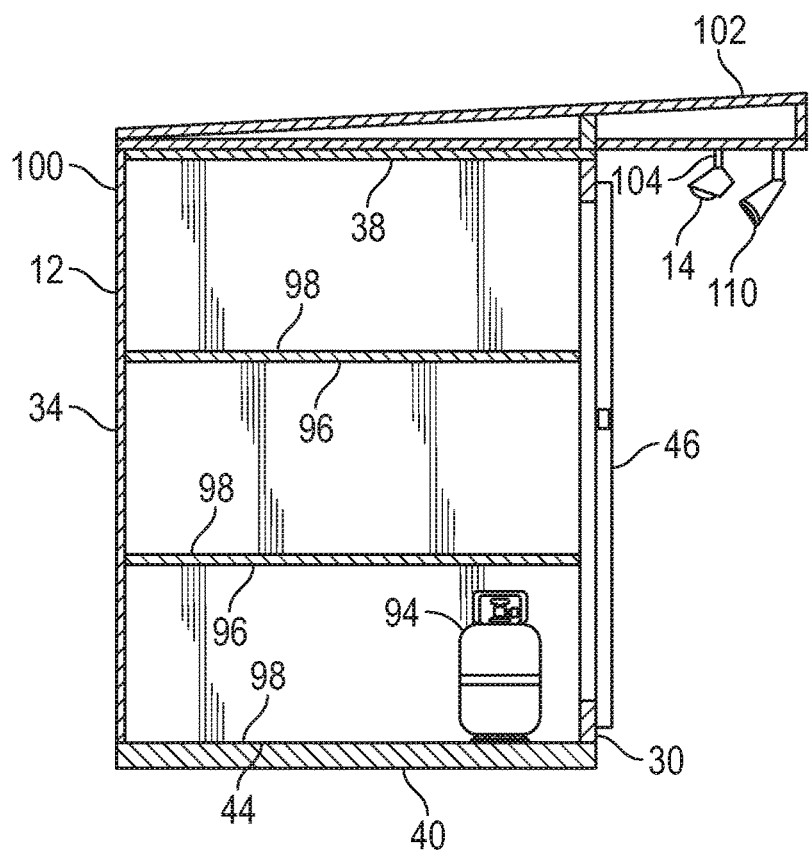
FIG. 4 is a cross-sectional view of the semi-automated canister distribution system of FIG. 3.
Figure 5:
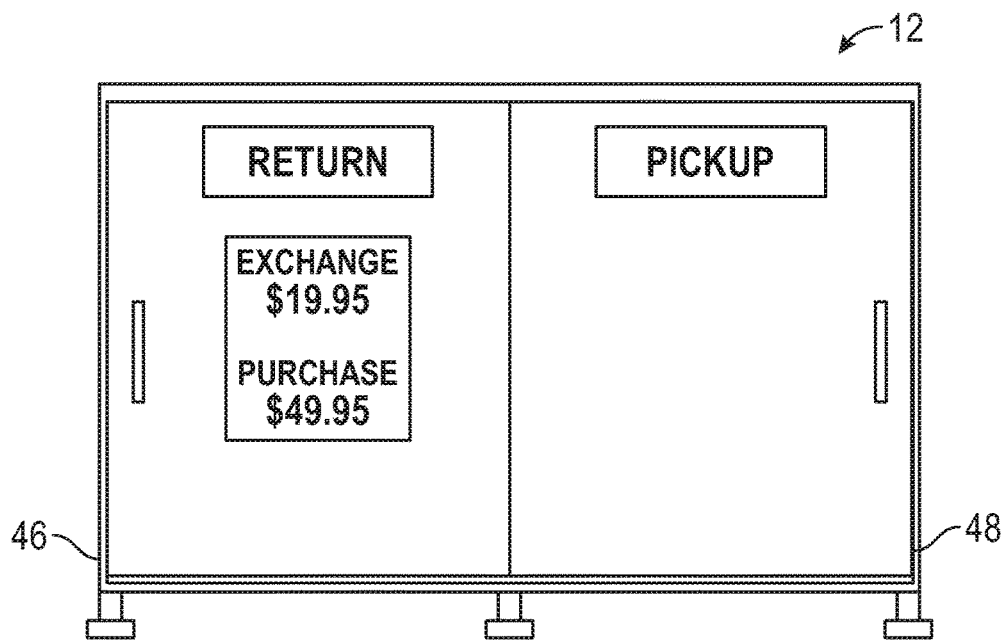
FIG. 5 is a front view of components of an exemplary embodiment of a semi-automated canister distribution system in accordance with the present disclosure.
Figure 6:
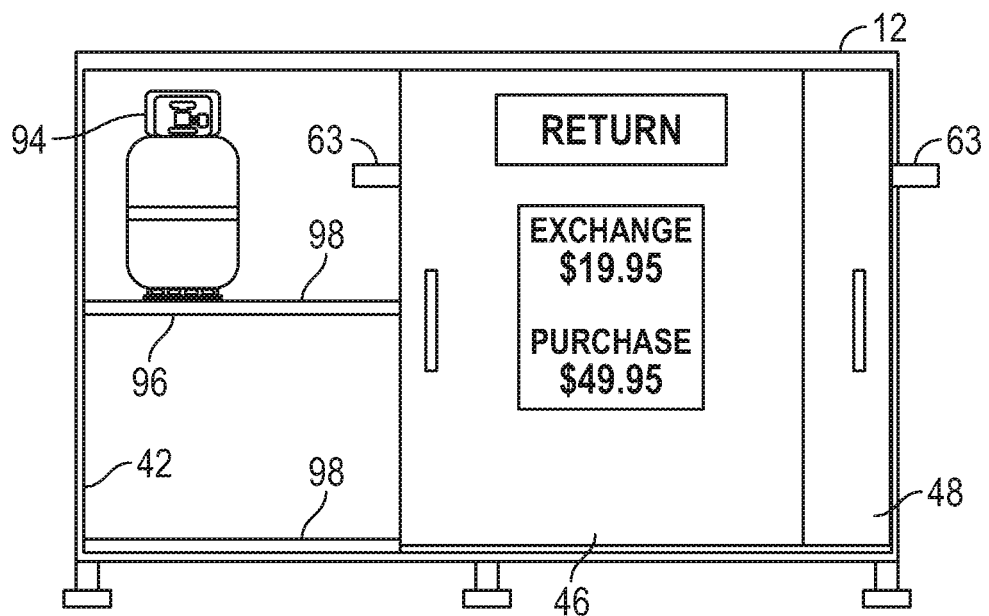
FIG. 6 is a front view of components of another exemplary embodiment of a semi-automated canister distribution system in accordance with the present disclosure.
Figure 7:
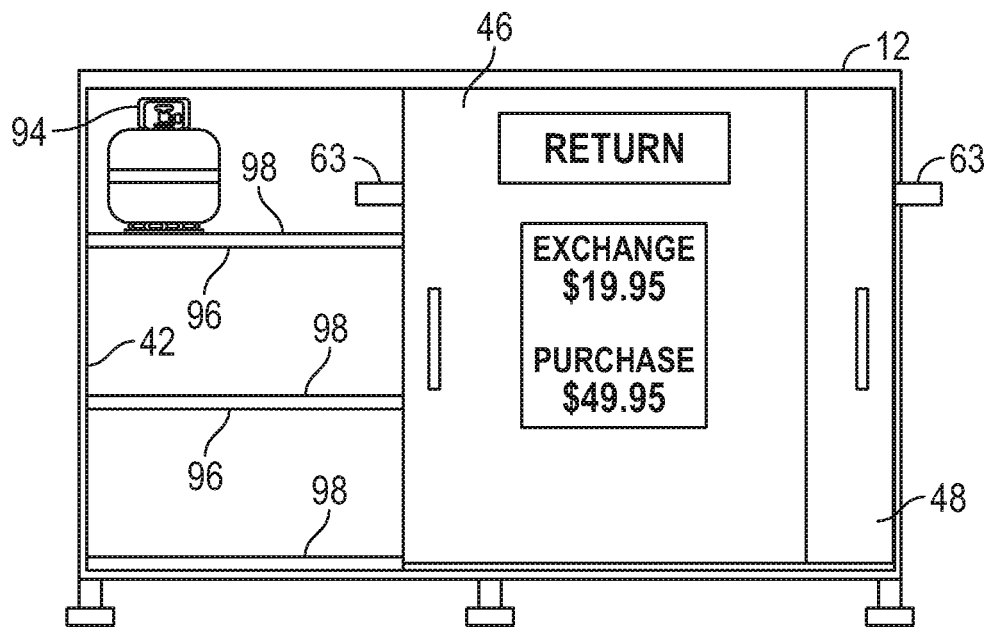
FIG. 7 is a front view of components of another exemplary embodiment of a semi-automated canister distribution system in accordance with the present disclosure.
Figure 8:
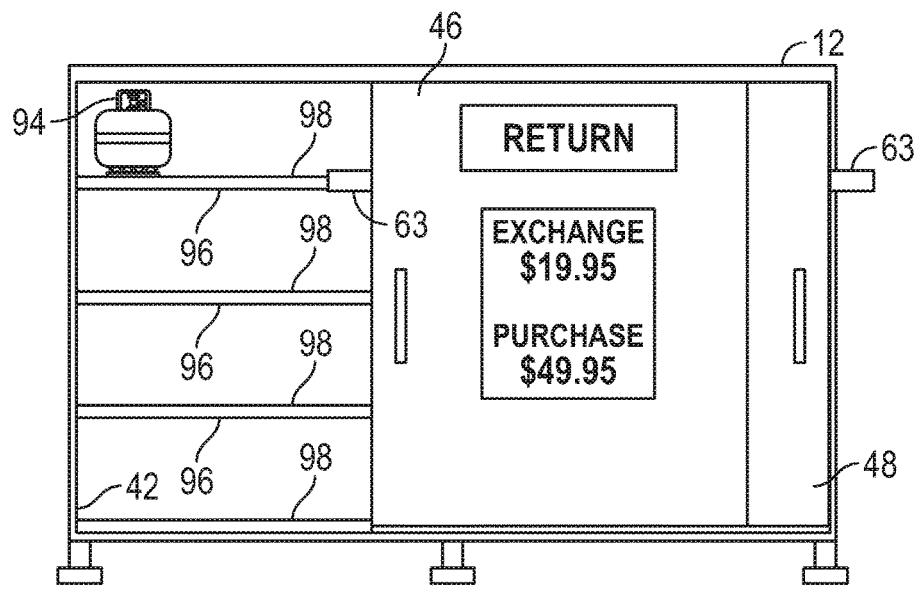
FIG. 8 is a front view of components of another exemplary embodiment of a semi-automated canister distribution system in accordance with the present disclosure.

As shown in FIGS. 2-4, in one embodiment, the cabinet 12 has a front 30, a first side 32, a back 34, a second side 36, a top 38, and a bottom 40. In one embodiment, one or more of the first side 32, the back 34, and the second side 36 comprise expanded metal. In one embodiment, the front 30 and/or the top 38 comprise sheet metal. In one embodiment, the bottom 40 comprises metal support bars. It will be understood that the first side 32, the back 34, the second side 36, the front 30, the top 38, and/or the bottom 40 may comprise additional or other materials or combinations of materials.

In one embodiment, the cabinet 12 has a first compartment 42 separated from a second compartment 44.

In one embodiment, the first compartment 42 and the second compartment 44 of the cabinet 12 are sized to accommodate one or more of the canisters 94, such as propane canisters. In one embodiment, the first compartment 42 and the second compartment 44 of the cabinet 12 are each sized to accommodate at least two propane canisters 94. In one embodiment, the first compartment 42 and the second compartment 44 of the cabinet 12 are each sized to accommodate one or more twenty-pound propane canister 94. In some embodiments, the first compartment 42 and the second compartment 44 of the cabinet 12 are sized to accommodate one or more 4.25-pound propane canister, eleven-pound propane canister, twenty-pound propane canister, thirty-pound propane canister, forty-pound propane canister, one hundred-pound canister, and/or combinations thereof.

In one embodiment, as illustrated in FIGS. 3-8, the first compartment 42 and the second compartment 44 of the cabinet 12 each have at least one shelf 96 defining at least two rows 98 for holding the canisters 94. In one embodiment, the first compartment 42 and the second compartment 44 of the cabinet 12 each have at least two shelves 96 defining at least three rows 98 for holding the canisters 94. In one embodiment, the first compartment 42 and the second compartment 44 of the cabinet 12 may have no internal shelves 96.

In one embodiment, the cabinet 12 may have multiple removable and/or movable shelves making up the rows 98 to accommodate one or more size of the canister 94. The shelves may be arranged according to the size of the canister 94.

In one embodiment, the first compartment 42 may be configured to contain one or more propane canisters 94 substantially filled with propane and the second compartment 44 may contain one or more propane canisters 94 substantially empty of propane. Of course, it will be understood that the first compartment 42 may be configured to contain one or more propane canisters 94 substantially empty of propane and the second compartment 44 may contain one or more propane canisters 94 substantially full of propane.

In one embodiment, the cabinet systems 11 of the semi-automated canister distribution system 10 may have a unique identifier distinguishing the cabinet systems 11 from one another. For example, the cabinet systems 11 may be identified with an alpha or alpha numeric code, such as "P1", "P2", "P3", etc.

In one embodiment, the first compartment 42 and the second compartment 44 may have unique identifiers to individually and/or uniquely identify the first compartment 42 from the second compartment 44 for the cabinet 12. In one embodiment, the first compartment 42 may be identified with an alpha or alpha-numeric designation, such as "A" or "A1", and the second compartment 44 may be labeled with an alpha or alpha-numeric designation, such as "B" or "B1" or "A2".

In one embodiment, the first door 46 and the second door 48 may be labeled with the unique identifiers to identify the first compartment 42 and the second compartment 44. In one embodiment, the first compartment 42 may be labeled with signage indicating that the first compartment 42 is to be used to return canisters 94 and the second compartment 44 may be labeled with signage indicating that the second compartment 44 is to be used to dispense (and pick-up from) full canisters 94. Of course, it will be understood that the second compartment 44 may be labeled to return canisters 94 and the first compartment 42 may be used to dispense full canisters 94.

As shown in FIGS. 2, 4, 14, and 15, in one embodiment, the cabinet 12 has a top portion 100 and the semi-automated canister distribution system 10 further comprises an overhang 102 extending from the top portion 100 of the cabinet 12. In one embodiment, the overhang 102 may be part of the top 38 of the cabinet 12. In one embodiment, the overhang 102 may be a separate component from the top 38 of the cabinet 12. In one embodiment, the overhang 102 extends beyond the top 38 of the cabinet 12 and over at least a portion of the front 30 of the cabinet 12. In one embodiment, the overhang 102 may be angled such that a first portion of the overhang 102 extending over at least a portion of the front 30 of the cabinet 12 is higher than a second portion of the overhang 102.

As shown in FIGS. 1, 3, and 6-15, in one embodiment, the first compartment 42 of the cabinet 12 may have a first door 46 and the second compartment 44 may have a second door 48. The first door 46 and the second door 48 each have an open position and a closed position. The first door 46 and the second door 48 each have a locked state and an unlocked state. In one embodiment, the first door 46 and/or the second door 48 are positioned on the front 30 of the cabinet 12. In one embodiment, the first door 46 and/or the second door 48 are positioned on the first side 32 and/or the second side 36 of the cabinet 12. The first door 46 and/or the second door 48 may have one or more handle 50.

In one embodiment, the first door 46 and/or the second door 48 may be self-closing. In one non-exclusive example, the first door 46 and/or the second door 48 may have one or more spring (not shown) attached such that the first door 46 and/or the second door 48 is moved to the closed position by the spring. In another non-exclusive example, the first door 46 and/or the second door 48 may have one or more self-closing hinge 52 attached such that the first door 46 and/or the second door 48 is moved to the closed position by the self-closing hinge 52. In another non-exclusive example, the first door 46 and/or the second door 48 may be weighted such that the first door 46 and/or the second door 48 are biased to the closed position. In yet another non-exclusive example, the first door 46 and/or the second door 48 may be attached to hydraulic or pneumatic door closers that pull the door closed after use and resist unexpected forces, such as wind gusts.

In one embodiment, the first door 46 and/or the second door 48 may slide to open, such as on runners, rollers, or channels. In one embodiment, the first door 46 may slide over the second door 48 when the first door 46 is in the open position and the second door 48 may slide under the first door 46 when the second door 48 is in the open position. Alternatively, the second door 48 may slide over the first door 46 and the first door 46 may slide under the second door 48.

In one non-exclusive example, the first door 46 and/or the second door 48 may be sliding doors that may be positioned on the compartment 42, 44 so as to be biased in a closed position, such that when the first door 46 and/or the second door 48 is in the open position the first door 46 and/or the second door 48 is at a higher position than when the door is in the closed position, such that gravity assists in closing the first door 46 and/or the second door 48. In one embodiment, the first door 46 and/or the second door 48 may be slidable on a rail that has a first end that is elevated from a second end such that an incline is created that allows the first door 46 and/or the second door 48 to move down the incline of the rail to the closed position.

Figure 15:
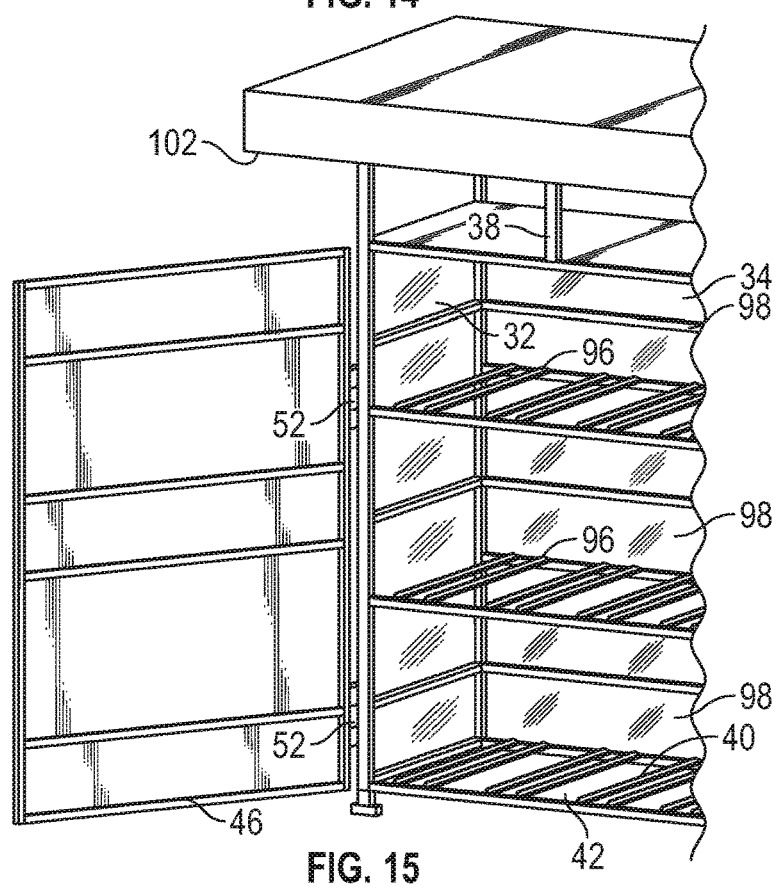
FIG. 15 is a partial perspective view of components of another exemplary embodiment of a semi-automated canister distribution system in accordance with the present disclosure.

In one embodiment, as shown in FIG. 15, the first door 46 and/or the second door 48 may swing out to the open position, such as by the use of one or more hinge 52.

In one embodiment, as shown in FIGS. 8-13 and 16-20, the cabinet system 11 of the semi-automated canister distribution system 10 further comprises a door lock system 60. Some or all of the components of the door lock system 60 may be electrical components. In one embodiment, the door lock system 60 may comply with standards for electrical components located near explosive environments and/or explosive substances, such as propane. Non-exclusive examples of such standards include standards and codes developed by the National Fire Protection Association standard (for example, NFPA 57, 2002 edition, and/or NFPA 70), the American Petroleum Institute, the International Electrotechnical Commission, and the Canadian Standards Association.

Figure 9:
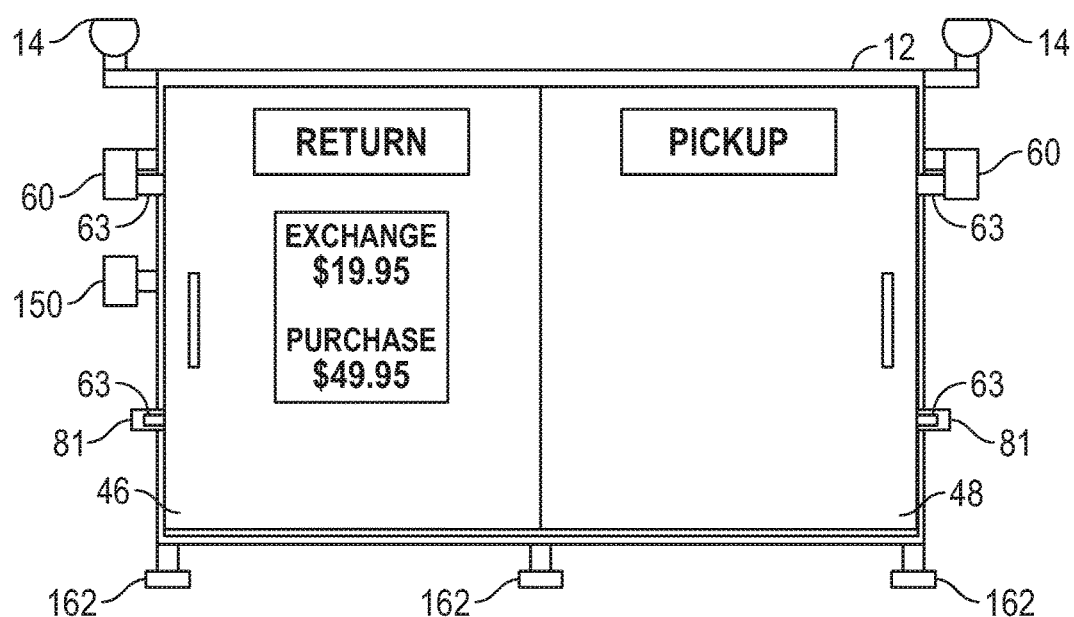
FIG. 9 is a front view of components of another exemplary embodiment of a semi-automated canister distribution system in accordance with the present disclosure.
Figure 10:
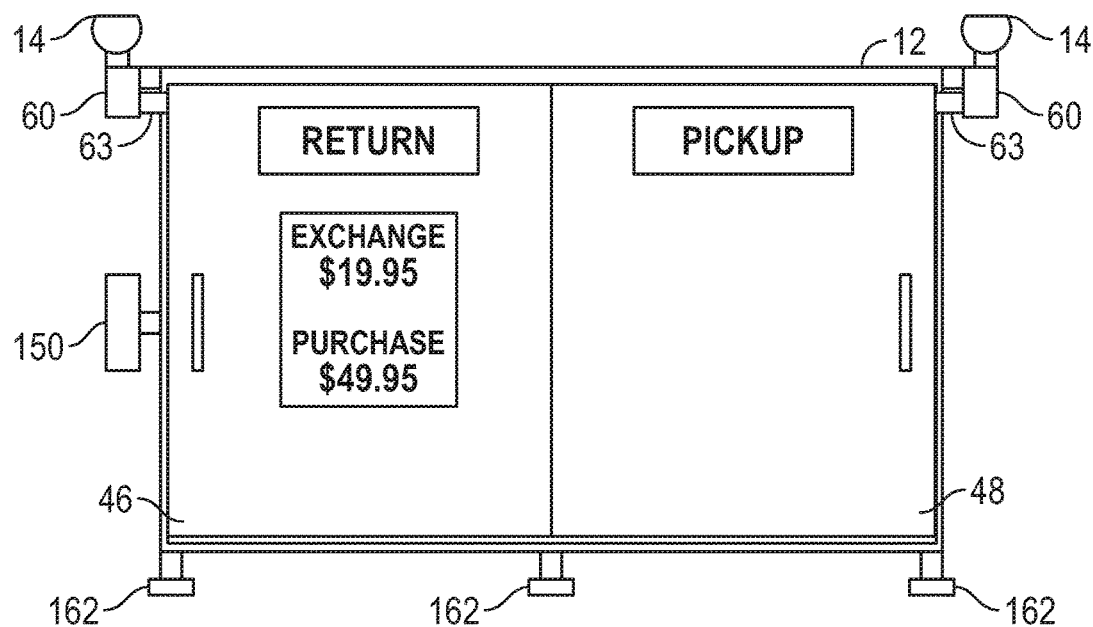
FIG. 10 is a front view of components of another exemplary embodiment of a semi-automated canister distribution system in accordance with the present disclosure.
Figure 13:
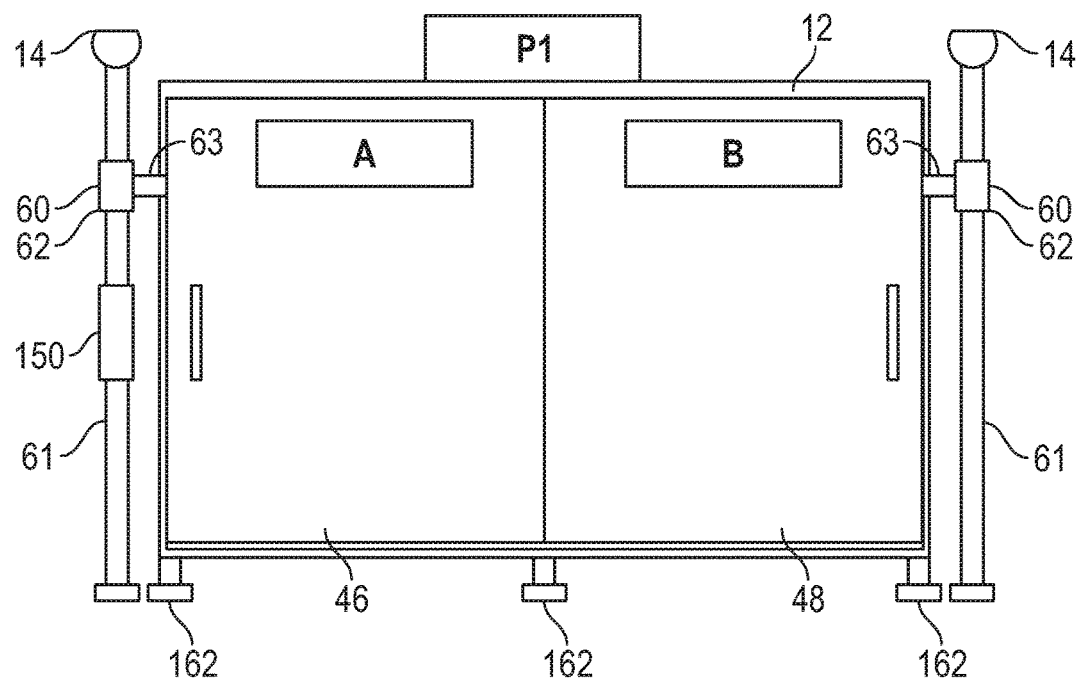
FIG. 13 is a front view of components of another exemplary embodiment of a semi-automated canister distribution system in accordance with the present disclosure.

As shown in FIGS. 9, 10, and 13, in one embodiment, some or all of the electrical components of the door lock system 60 may be attached to, but outside of, the cabinet 12.

Figure 11:
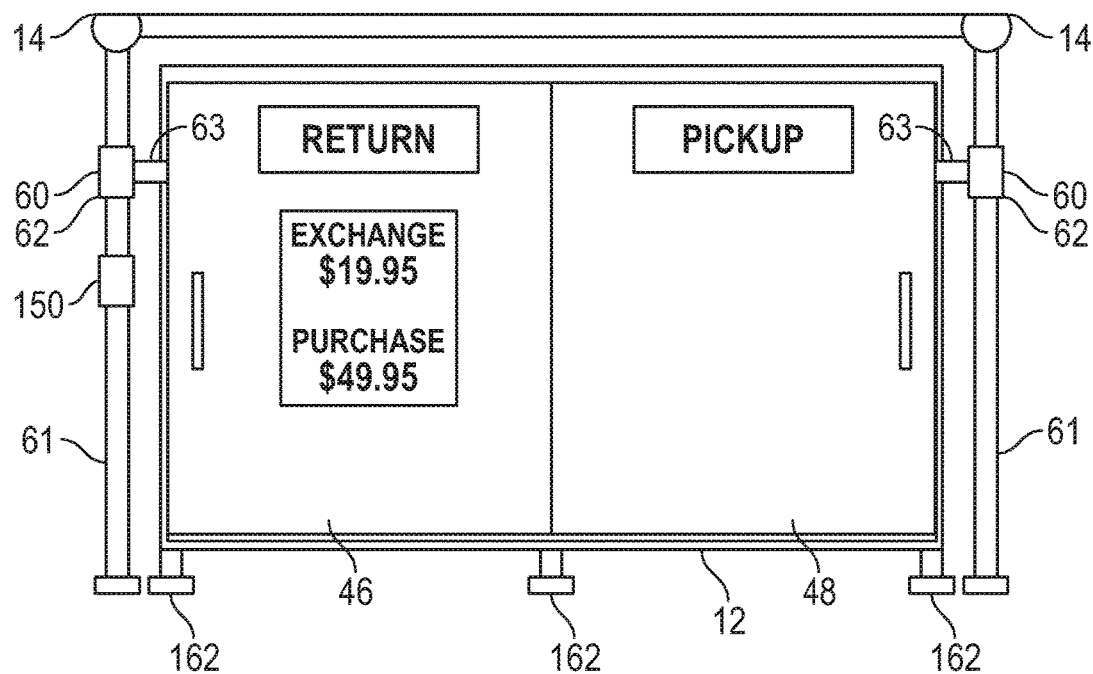
FIG. 11 is a front view of components of another exemplary embodiment of a semi-automated canister distribution system in accordance with the present disclosure.
Figure 12:
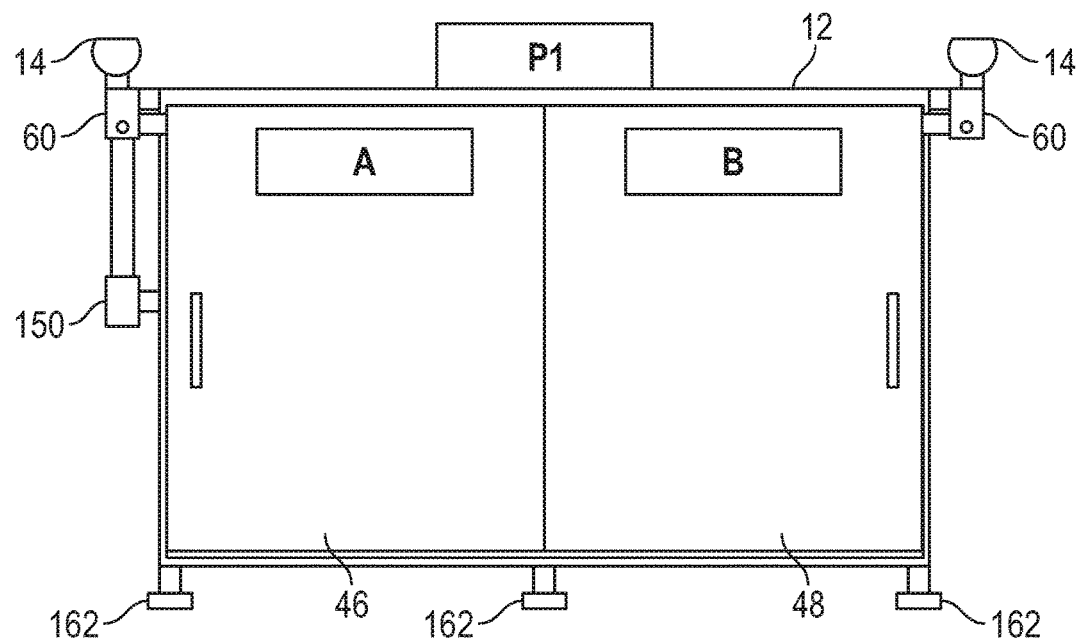
FIG. 12 is a front view of components of another exemplary embodiment of a semi-automated canister distribution system in accordance with the present disclosure.

As shown in FIGS. 11 and 13, in one embodiment, some or all of the electrical components of the door lock system 60 may be detached from, and outside of, the cabinet 12. In one embodiment, the electrical components may be connected to a post 61 detached from the cabinet 12. In one embodiment, the door lock system 60 comprises a lockbox 62 engageable with a latch 63 on the door 46, 48, of the compartment 42, 44. In one embodiment, the lockbox 62 is attached to the cabinet 12. In one embodiment, the lockbox 62 is detached from the cabinet 12. The lockbox 62 may comprise a receiver, a lock, a door sensor, and/or a mechanical lock-over-ride mechanism. The lockbox 62 may have a guide mechanism to allow the lockbox 62 to be moved to engage with the latch 63. In one embodiment, the lockbox 62 may be adjustable (for example, rotatable and/or laterally moveable) such that the receiver is substantially aligned and perpendicular to the latch 63.

In one embodiment, the door lock system 60 may be pneumatically operated and may comprise one or more air compressor, one or more air valve, and one or more air hose.

Figure 16:
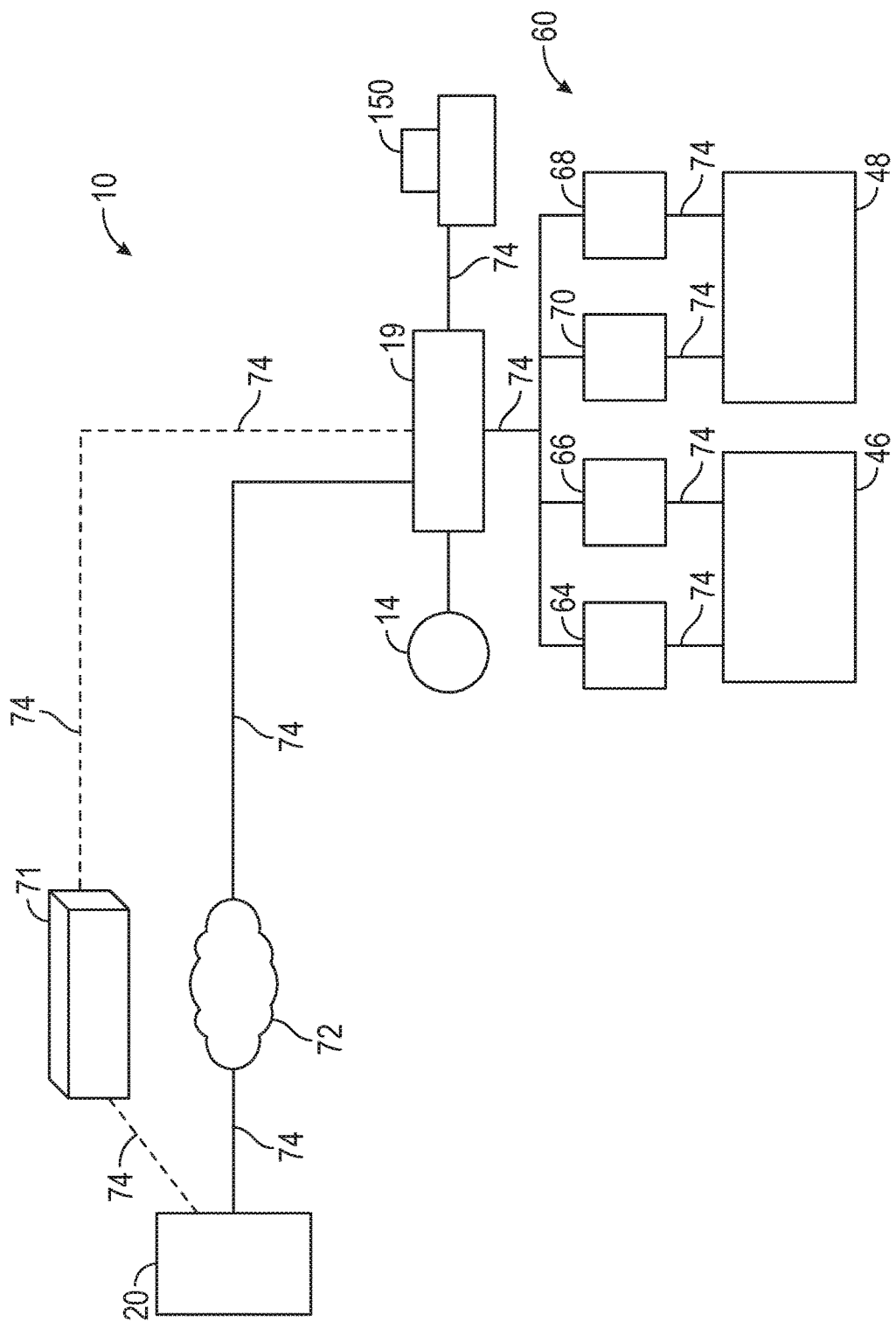
FIG. 16 is a schematic diagram of components of an exemplary embodiment of a semi-automated canister distribution system in accordance with the present disclosure.

As illustrated in FIG. 16, in one embodiment the door lock system 60 may comprise a first door sensor 64, a first door lock 66, a second door sensor 68, and a second door lock 70. The door lock system 60 may be located partially, substantially, or completely outside of the cabinet 12. In one embodiment, the door lock system 60 is substantially or entirely located outside of the cabinet 12 such that one or more components of the door lock system 60 are not required to be rated for use in an explosive environment and/or not required to be rated for use in compartments containing propane canisters.

In one embodiment, the cabinet controller 19 may be in communication with and/or in control of the door lock system 60. The cabinet controller 19 may serve as a connector, enabling devices and components of the semi-automated canister distribution system 10 to communicate, share information, and allocate resources. The cabinet controller 19 may be connected to the remote display 18 and/or the remote controller device 20 through a wireless access point 71 and/or a network 72. Such connection 74 may be wired, wireless, or a combination of wired and wireless.

In one embodiment, the cabinet controller 19 may be connected to the other components of the cabinet system 11, such as the door lock system 60, via one or more electrical connections 74, which may be wired, wireless, or a combination of wired and wireless.

In one embodiment, the first door sensor 64 may determine when the first door 46 is in the closed position, and the second door sensor 68 may determine when the second door 48 is in the closed position. In one embodiment, the first door sensor 64 may determine when the first door 46 is in the open position, and the second door sensor 68 may determine when the second door 48 is in the open position.

In one embodiment, the first door sensor 64 and/or the second door sensor 68 is a proximity sensor which determines when the first door 46 and/or the second door 48 are in proximity to the first door sensor 64 and/or the second door sensor 68.

In one embodiment, the first door sensor 64 and/or the second door sensor 68 is a magnetic door sensor. The magnetic door sensor may comprise a first component, such as a reed switch, and a second component having a magnetic portion. In one embodiment, the first component may be positioned on the cabinet 12 and the second component may be positioned on the first door 46 or the second door 48 such that when the first door 46, for example, is in the closed position, the magnetic portion of the second component is in contact with the first component such that a circuit in the first component is closed. When the first door 46, for example, is moved to the open position, the magnetic portion of the second component is moved out of contact with the first component, such that the circuit is open (interrupted). The open circuit may be indicative of the first door 46, for example, being in the open position. The closed circuit may be indicative of the first door 46, for example, being in the closed position. It will be understood, however, that the open circuit may be indicative of the first door 46, for example, being in the closed position and the closed circuit may be indicative of the first door 46 being in the open position.

In one embodiment, the first door sensor 64 may transmit one or more signal to the cabinet controller 19 when the first door sensor 64 detects the first door 46 is in the closed position. In one embodiment, the first door sensor 64 may transmit one or more signal to the cabinet controller 19 when the first door sensor 64 detects the first door 46 is in the open position. In one embodiment, the second door sensor 68 may transmit one or more signal to the cabinet controller 19 when the second door sensor 68 detects the second door 48 is in the closed position. In one embodiment, the second door sensor 68 may transmit one or more signal to the cabinet controller 19 when the second door sensor 68 detects the second door 48 is in the open position.

The first door lock 66 is a locking device that locks and unlocks the first door 46. The first door lock 66 may receive a signal from the cabinet controller 19 to engage or disengage the first door lock 66 to lock or unlock the first door 46.

The second door lock 70 is a locking device that locks and unlocks the second door 48. The second door lock 70 may receive a signal from the cabinet controller 19 to engage or disengage the second door lock 70 to lock or unlock the second door 48.

In one embodiment, the first door lock 66 and/or the second door lock 70 is an electromagnetic lock activated with an electrical current.

In one embodiment, the first door lock 66 and/or the second door lock 70 is a solenoid lock. One non-exclusive example of a solenoid lock is the solenoid lock manufactured by Dongguan Boshan Industry Co., located in Hengi Town, Dongguan, Guangdong, China (523460). Of course, it will be understood that other solenoid locks, and/or other types of locks may be used.

Figure 17:
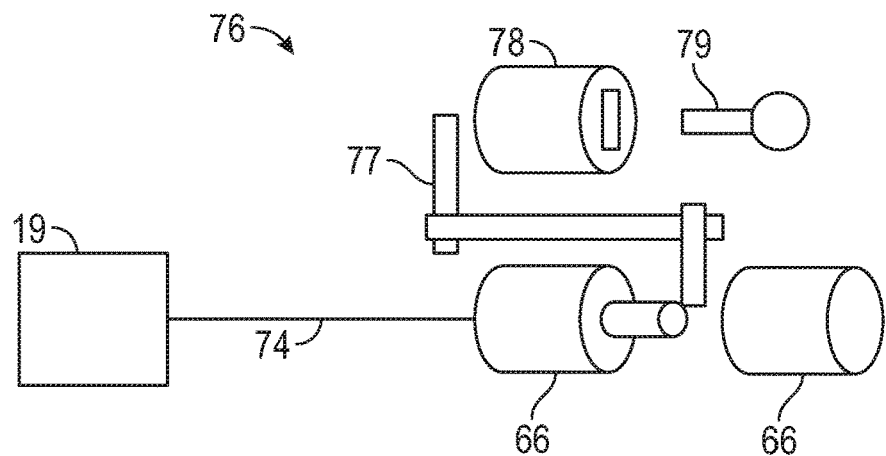
FIG. 17 is a schematic diagram of components of an exemplary embodiment of a door lock system in accordance with the present disclosure.
Figure 18:
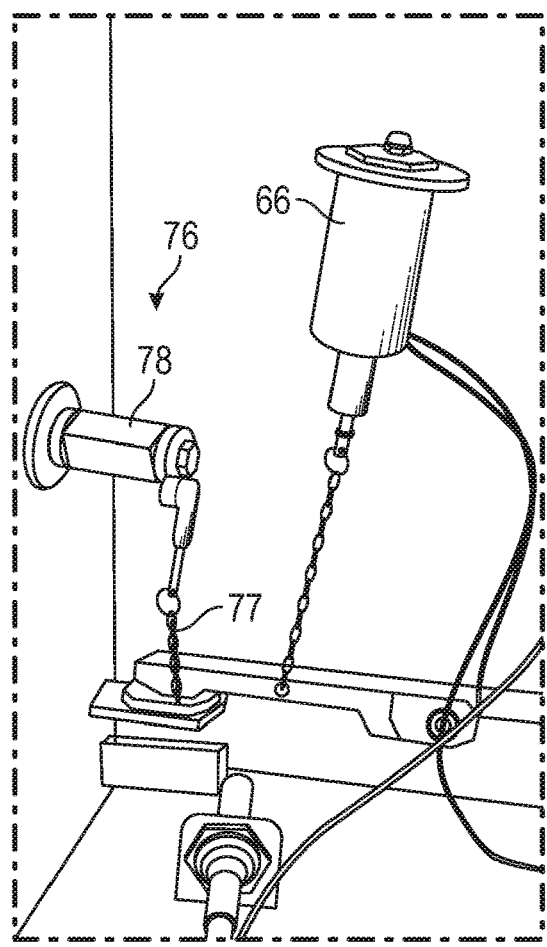
FIG. 18 is a schematic of components of an exemplary embodiment of a door lock system in accordance with the present disclosure.
Figure 19A:
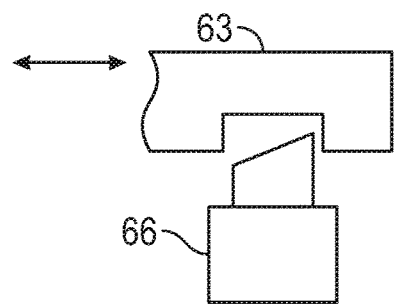
FIG. 19A is a partial schematic of components of another exemplary embodiment of a door lock system in accordance with the present disclosure.
Figure 19B:
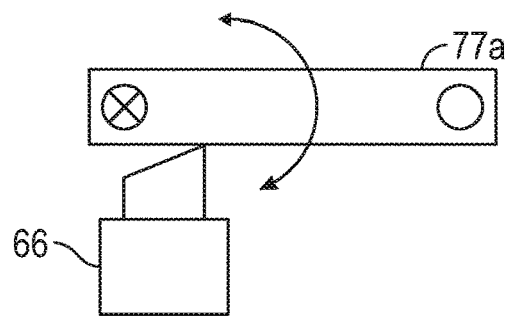
FIG. 19B is a partial schematic of components of the door lock system of FIG. 19A.

In one embodiment, the door locking system 60 may have a manual override device 76 for the first door lock 66 and/or the second door lock 70. FIGS. 17-19 illustrate non-exclusive examples of the manual override device 76. The manual override device 76 may be used to manually lock or unlock the first door 46 and/or the second door 48, and may be used to mechanically and/or electrically interrupt the first door lock 66 and/or the second door lock 68. For example, in the case of loss of power to the semi-automated canister distribution system 10, the manual override device 76 may be used to manually interrupt the solenoid or electromagnetic locks and unlock the first door 46 and the second door 48. In one embodiment, the manual override device 76 may comprise one or more mechanical interruption device 77, one or more mechanical lock 78, and one or more key 79. In one embodiment, the rotation of the key 79 may trigger the mechanical interruption device 77.

In one embodiment, the first and second door locks 66, 68 may include comprise a mechanical lock 78a, such as a padlock. In one embodiment, the cabinet 12 may have one or more ear 81 on the first side and/or the second side of the cabinet 12, or on the front of the cabinet 12, and may further have the latch 63 on the first door and/or the second door. The one or more ears 81 on the first and/or second side of the cabinet may align with the latch 63 of the first door and/or the second door when the first door and/or the second door is in the closed position. The mechanical lock 78a may be engaged through the latch 63 and the ear 81 to mechanically secure the first door and/or the second door in the closed position.

Figure 20:
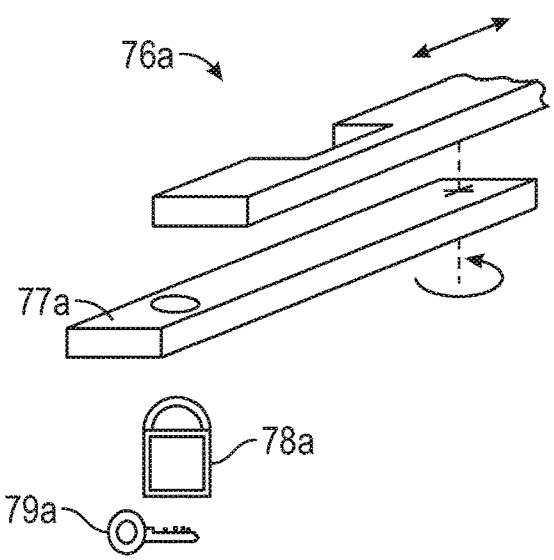
FIG. 20 is a partial schematic of components of another exemplary embodiment of a door lock system in accordance with the present disclosure.

FIG. 20 illustrates another embodiment of an exemplary manual override device 76a for the first door lock 66 and/or the second door lock 70. The manual override device 76a may comprise one or more mechanical lock 78a, such as a padlock, one or more key 79a, and one or more mechanical interruption device 77a. The mechanical interruption device 77a may include a lever with a first end portion outside of the cabinet 12 and a second end portion extending through the cabinet 12 and/or the first door 46, for example, and positioned to manually interrupt the solenoid or electromagnetic locks and thereby unlock the first door 46, for example. The mechanical lock 78a may be positioned through the first end portion of the lever to prevent the lever from interrupting the solenoid lock while the mechanical lock 78a is engaged. The operator 92 may remove the mechanical lock 78a from the first position of the lever and rotate (or otherwise move) the lever to depress a tongue of the solenoid lock to disengage the tongue from the door latch 63, thereby unlocking the first door 46.

In one embodiment, the door locking system 60 may have an indicator to signal a purchaser 82 that the first door 46 and/or the second door 48 is locked and/or unlocked. In one embodiment, the indicator may be a lighted sign, such as a sign reading "OPEN," to signal the purchaser 82 to open the first door 46 and/or the second door 48 once the first door 46 and/or the second door 48 is unlocked. In one embodiment, the indicator may be an audio device, such as a buzzer, to signal the purchaser 82 to open the first door 46 and/or the second door 48 once the first door 46 and/or the second door 48 is unlocked.

In one embodiment, the at least one camera 14 may be positioned outside of and relative to the cabinet 12 such that the field of view of the at least one camera 14 encompasses at least a portion of the interior of the cabinet 12 and/or an area in proximity to the cabinet 12, such that the at least one camera 14 may capture one or more image of the purchaser 82 of a canister 94 from the semi-automated canister distribution system 10 and/or one or more canister 94 in or in proximity to the cabinet 12. In one embodiment, the at least one camera 14 comprises a first camera 14 positioned outside of and relative to the cabinet 12 such that the field of view of the at least one camera 14 encompasses at least a portion of the interior of the cabinet 12 and/or an area in proximity to the cabinet 12 and comprises at least one user-verification camera 90.

The user-verification camera 90 may be positioned outside of and relative to the cabinet 12 such that the field of view of the user-verification camera 90 encompasses an area in proximity to the cabinet 12. The user-verification camera 90 may be positioned with a field of view such that the user-verification camera 90 may capture one or more image of the purchaser 82 of a canister 94 from the semi-automated canister distribution system 10. The user-verification camera 90 may be positioned with a field of view such that the user-verification camera 90 may capture one or more image of one or more canister 94 brought by the purchaser 82 for return to the semi-automated canister distribution system 10. In one embodiment, an area may be outlined on the ground in the field of view of the user-verification camera 90 in which the purchaser 82 may stand and/or may place canister(s) 94 for return or canister(s) removed from the cabinet 12 for purchase.

In one embodiment, the at least one camera 14 comprises at least two user-verification cameras 90, such as a first user-verification camera 90 having a field of view proximate to the first side 32 of the cabinet 12, and a second user-verification camera 90 having a field of view proximate to the second side 36 of the cabinet 12.

In one embodiment, the cabinet system 11 comprises one or more motion detection sensors (not shown) and the at least one camera 14 and/or the at least one user-verification camera 90 is activated by utilizing one or more motion detection sensors to detect the presence of the purchaser 82 at the cabinet 12. In one embodiment, the at least one camera 14 and/or the at least one user-verification camera 90 is activated by the purchaser 82 activating the signaling device 80. In one embodiment, an operator 92 of the semi-automated canister distribution system 10 may activate the at least one camera 14 and/or the at least one user-verification camera 90. In one embodiment, the at least one camera 14 and/or the at least one user-verification camera 90 may be continuously active.

In one embodiment, the at least one camera 14 and/or the at least one user-verification camera 90 may comply with standards for electrical components located near explosive environments and/or explosive substances, such as propane. Non-exclusive examples of such standards include standards and codes developed by the National Fire Protection Association standard (for example, NFPA 57, 2002 edition, and/or NFPA 70), the American Petroleum Institute, the International Electrotechnical Commission, and the Canadian Standards Association. As shown in FIGS. 9, 10, and 13 in one embodiment, some or all of the electrical components of the at least one camera 14 and/or the at least one user-verification camera 90 may be attached to, but outside of, the cabinet 12. As shown in FIGS. 11 and 13 in one embodiment, some or all of the electrical components of the at least one camera 14 and/or the at least one user-verification camera 90 may be detached from and outside of the cabinet 12.

The at least one camera 14 and/or the at least one user-verification camera 90 may transmit a signal through the cabinet controller 19, or directly, to the remote display 18 and/or the remote controller device 20 indicative of the purchaser's presence at the cabinet 12. In one embodiment, the at least one camera 14 and/or the at least one user-verification camera 90 may transmit live video feed through the cabinet controller 19, or directly, to the remote display 18 of an area around the cabinet 12, such as including live video feed of the purchaser 82 at the cabinet 12.

The at least one camera 14 may be positioned outside of and relative to the cabinet 12 such that the at least one camera 14 has a field of view encompassing at least a portion of the interior of the cabinet 12 when the first door 46 or the second door 48 is in the open position, and/or encompassing an area in proximity to the cabinet 12, such that the at least one camera 14 may capture one or more image of the purchaser 82 of the canister 94 from the semi-automated canister distribution system 10 and/or may capture one or more image of canisters 45 outside and/or inside the cabinet 12.

In one embodiment, the at least one camera 14 is connected to the overhang 102 of the cabinet 12. In one embodiment, the at least one camera 14 is connected to the overhang 102 via one or more supports 104. In one embodiment, the at least one camera 14 is connected to the cabinet 12. Of course, it will be understood that the at least one camera 14 may be unconnected to the cabinet 12 or overhang 102 as long as the at least one camera 14 is positioned outside of and relative to the cabinet 12 such that the at least one camera 14 has a field of view encompassing at least a portion of the interior of the cabinet 12 when the first door 46 or the second door 48 is in the open position, and/or encompassing an area in proximity to the cabinet 12, such that the at least one camera 14 may capture one or more image of the purchaser 82 of the canister 94 from the semi-automated canister distribution system 10 and/or may capture one or more image of canisters 94 outside and/or inside the cabinet 12.

In one embodiment, the at least one camera 14 is a first camera 14 and a second camera 14. The first camera 14 may be positioned relative to the cabinet 12 such that the first camera 14 has a field of view encompassing at least a portion of an interior of the first compartment 42 of the cabinet 12 when the first door 46 is in the open position and/or encompassing an area in proximity to the first compartment 42 of the cabinet 12, such that the first camera 14 may capture one or more image of the purchaser 82 of the canister 94 from the semi-automated canister distribution system 10.

In one embodiment, the second camera 14 may be positioned relative to the cabinet 12 such that the second camera 14 has a field of view encompassing at least a portion of an interior of the second compartment 44 of the cabinet 12 when the second door 48 is in the open position and/or encompassing an area in proximity to the second compartment 44 of the cabinet 12, such that the first camera 14 may capture one or more image of the purchaser 82 of the canister 94 from the semi-automated canister distribution system 10 and/or one or more image of the canister 94 outside and/or inside the cabinet 12.

In one embodiment, the cabinet system 11 of the semi-automated canister distribution system 10 may further comprise at least one light source 110 positioned outside of and relative to the cabinet 12 such that the at least one light source 110 produces light into the interior of the cabinet 12 when the first door 46 or the second door 48 is in the open position. In one embodiment, the at least one light source 110 is connected to the overhang 102 and/or the cabinet 12.

Figure 14:
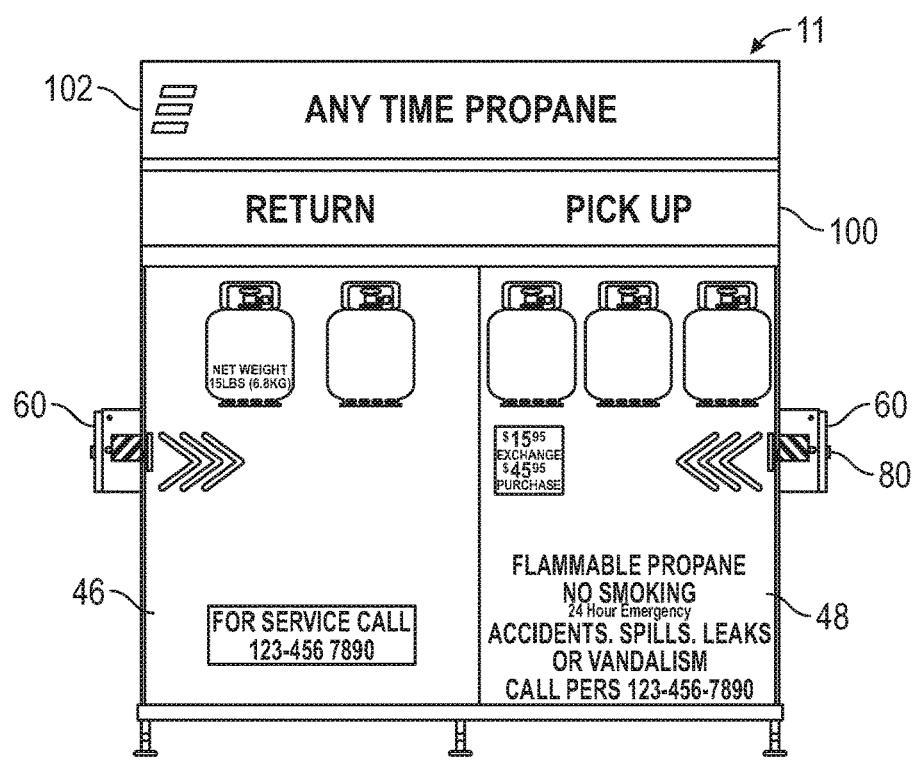
FIG. 14 is a front view of a cabinet system of an exemplary embodiment of a semi-automated canister distribution system in accordance with the present disclosure.

In one embodiment, the at least one light source 110 may comply with standards for electrical components located near explosive environments and/or explosive substances, such as propane. Non-exclusive examples of such standards include standards and codes developed by the National Fire Protection Association standard (for example, NFPA 57, 2002 edition, and/or NFPA 70), the American Petroleum Institute, the International Electrotechnical Commission, and the Canadian Standards Association. As shown in FIGS. 2-3, in one embodiment, the light source 110 may be attached to, but outside of, the cabinet 12. As shown in FIG. 14, in one embodiment, the light source 110 may be detached from and outside of the cabinet 12.

Figure 21:
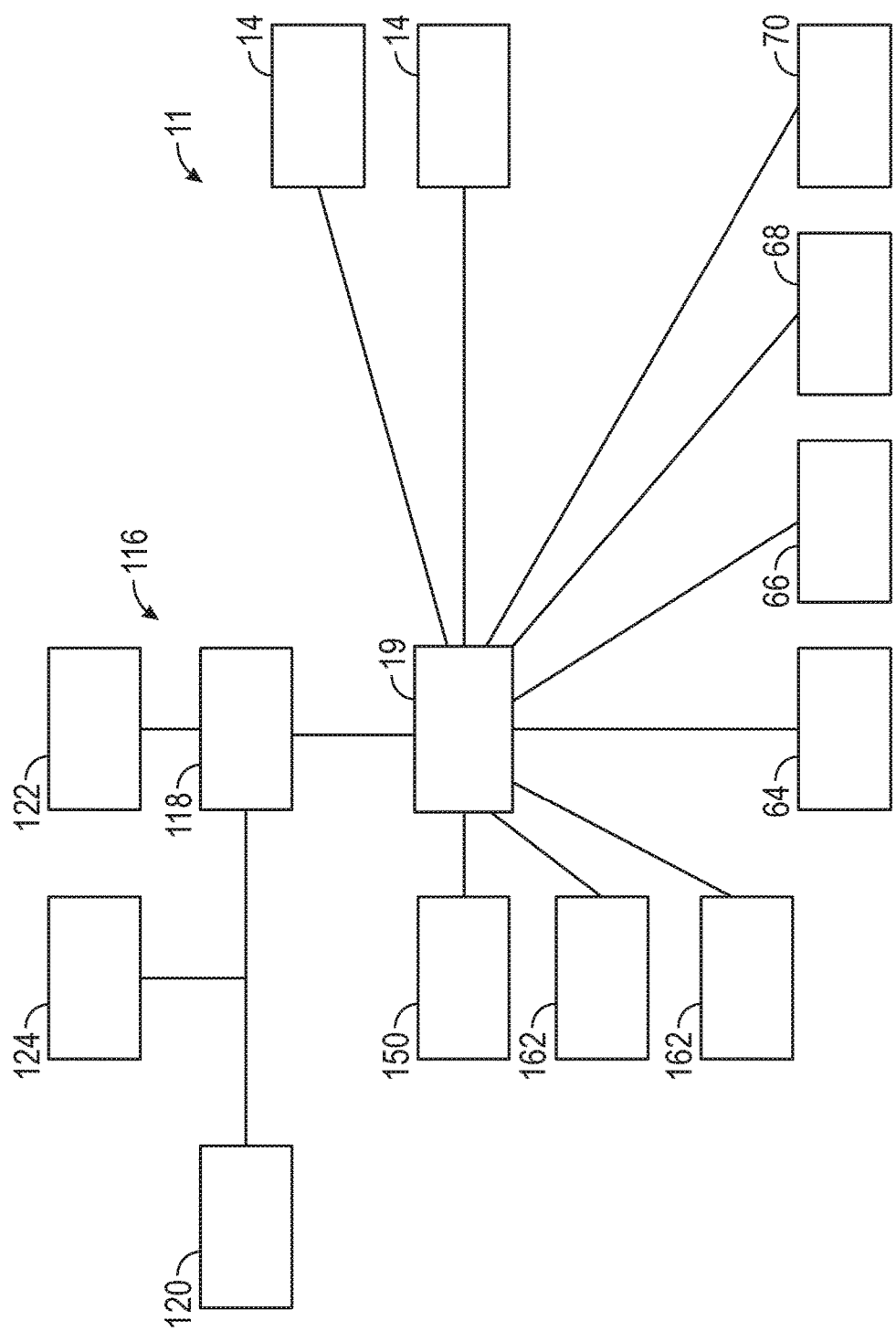
FIG. 21 is a schematic diagram of an exemplary embodiment of a cabinet system in accordance with the present disclosure.

In one embodiment, as shown in FIG. 21, the cabinet system 11 of the semi-automated canister distribution system 10 may further comprise a power system 116 connected to components of the cabinet 12. The power system 116 may comprise a power supply 118, a power cord 120, a battery 122, and an alternating-current sensor 124. The power cord 120 may be plugged into a standard source of electrical power, such as a standard electrical grid. The power supply 118 may convert alternating current to direct current to supply the cabinet system 11 with electrical power. In the event that there is a loss of electrical power, the power supply 118 may be supplied with electrical power by the battery 122.

The alternating-current sensor 124 may be positioned to detect electrical current through the power cord 120 to the power supply 118. The cabinet controller 19 reads the alternating-current sensor 124 to detect the status of electrical power. The cabinet controller 19 may transmit one or more signal indicative of the loss of power to the system controller 200, the remote controller device 20, and/or the remote management entity 180.

In one embodiment, the components of the door lock system 60, the at least one camera 14, the user-verification camera 90, and any other electrical components may be placed outside of, and/or at a prescribed distance away from, the cabinet 12 in compliance with safety standards, such as governmental and industry safety standards for explosive environments, such as propane storage areas. In one embodiment, the electrical components may be outside of but attached to the cabinet 12. In one embodiment, the electrical components may be outside of and electrically detached from the cabinet 12.

In one embodiment, the first door sensor 64 and the second door sensor 68 may be placed inside the cabinet 12. In such a case, the first and second door sensors 64, 68, as well as other electrical components placed inside the cabinet 12, may comply with standards for electrical components located in explosive environments. Non-exclusive examples of such standards include standards and codes developed by the National Fire Protection Association standard (for example, NFPA 57, 2002 edition, and/or NFPA 70), the American Petroleum Institute, the International Electrotechnical Commission, and the Canadian Standards Association.

Returning to FIGS. 1 and 2, in one embodiment, the cabinet system 11 of the semi-automated canister distribution system 10 may further comprise a human-machine interface 150 positioned on or near the cabinet 12. The human-machine interface 150 may be in communication with the remote controller device 20 and/or the cabinet controller 19.

In one embodiment, the remote controller device 20 may transmit one or more signal to the cabinet controller 19 indicative of a data element that may be accepted by the cabinet controller 19 through the human-machine interface 150 when presented by the purchaser 82 in order for the cabinet controller 19 to trigger the door lock system 60 to disengage the first and/or second door lock 66, 70. The data element may be any designated data that is predetermined such that the cabinet system 11 recognizes the purchase transaction. Non-exclusive examples of the data element include one or more of a code, an audio signal, facial recognition, bio-metrics, and so on. Where appropriate, the data element may be given to the purchaser.

In one embodiment, the human-machine interface 150 may be in communication with the cabinet controller 19 which may be in communication with the door lock system 60.

The human-machine interface 150 may comprise one or more of, or combination of one or more of, a keypad, a card reader, a voice recognition unit, a microphone, a bar code scanner, and/or other data entry device. The human-machine interface 150 may accept input of a data element, such as a numbered or letter code through a keypad; or an electronic code from a personal computing device, such as a smart phone or other personal computing device; or through a bar code reader. Acceptance of the data element by the human-machine interface 150 may cause the human-machine interface 150 to signal the cabinet controller 19 to trigger the door lock system 60 to disengage the first and/or second door lock 66, 70.

In one embodiment, the human-machine interface 150 of the cabinet system 11 may have at least one signaling device 80 (non-exclusive examples of which include at least one bell, buzzer, or button) that the purchaser 82 may use to indicate the presence of the purchaser 82 near the cabinet 12. The signaling device 80 may transmit one or more signal to the cabinet controller 19 when the signaling device 80 is activated by the purchaser 82. Based on the signal from the signaling device 80, the cabinet controller 19 may transmit a signal to the remote display 18 and/or the remote controller device 20 indicative of the purchaser's presence near the cabinet 12. In one embodiment, based on a signal from the signaling device 80, the at least one camera 14 may transmit one or more image and/or live stream video through the cabinet controller 19, or directly, to the remote display 18 and/or the remote controller device 20.

In one embodiment, the signaling device 80 may be shaped as, or may be labeled with, an instruction for the purchaser 82, such as an instruction to depress or push the signaling device 80. In one embodiment, instructions for the use of the semi-automated canister distribution system 10 may be posted on or near the cabinet 12.

In one embodiment, the at least one signaling device 80 is a first signaling device 80 and a second signaling device 80, such as a first button and a second button. In one embodiment, the first signaling device 80 may be located proximate to the first compartment 42. For example, the first signaling device 80 may be located on the first side 32. In one embodiment, the second signaling device 80 may be located proximate to the second compartment 44. For example, the second signaling device 80 may be located on the second side 36.

In one embodiment, the at least one signaling device 80 may comprise other forms of circuits instead of, or in addition to, the signaling device 80. Non-exclusive examples of the at least one signaling device include buttons, touch screens, photo-sensitive elements which detect changes in light, proximity sensors, motion detectors, and electrically conductive painted components.

In one embodiment, the human-machine interface 150 may comprise a speaker, a microphone, a light source, and/or other communication device.

In one embodiment, entry of the data element into the human-machine interface 150 may cause the human-machine interface 150 to send a signal to the cabinet controller 19 which may send a signal to the remote controller device 20 and/or the remote display alerting the operator 92 of the remote controller device 20 that a data element has been entered.

In one embodiment, as shown in FIGS. 1 and 3, the cabinet system 11 of the semi-automated canister distribution system 10 may further comprise an auto-count system 160. The auto-count system 160 is structured to track the number of canisters 94 being deposited in the first compartment 42 of the cabinet 12 and/or the number of canisters 94 being withdrawn from the second compartment 44 of the cabinet 12. The auto-count system 160 may comprise one or more unit detection devices 162, non-exclusive examples of which include one or more or combinations of the following: one or more scales, one or more weight sensors, one or more proximity sensors, one or more computer vision devices (including camera(s) 14), one or more LiDAR (Light Detection And Ranging) devices, and/or one or more light barrier devices.

In one embodiment, as shown in FIG. 3, the unit detection device 162 is implemented as one or more weight sensors positioned in the bottom 40 of the cabinet 12, the shelves 96 of the cabinet, and/or the within the first compartment 42 and/or the second compartment 44 of the cabinet 12. In one embodiment, the one or more weight sensors may be one or more load cells and/or one or more weigh bars.

In one embodiment, the auto-count system 160 may comprise one or more computer processor 164. The auto-count system 160 may share components, computer processing functionality, memory, and/or functions with the cabinet controller 19 and/or the system controller 200.

The auto-count system 160 may use the one or more unit detection device 162 to determine how many canisters 94 are returned to or removed from the first compartment 42 of the cabinet 12. For example, the one or more unit detection device 162 may determine that weight has been added to the first compartment 42 and the auto-count system 160 may divide that weight by a known weight of returned canisters 94 to determine the number of canisters 94 returned. The auto-count system 160 may use a range of weight or round the weight to determine the number of canisters 94 returned. In one embodiment, the auto-count system 160 and/or the cabinet controller 19 may determine the expected weight of the returned canister 94 based on information from the unit detection device 162, such as that described below.

In one embodiment, the one or more unit detection device 162 is positioned to detect one or more canister 94 present outside of the cabinet 12 when the user approaches the cabinet 12. For example, when the user approaches the cabinet 12, the unit detection device 162 may scan or image the immediate field of view in front of the cabinet 12. In one embodiment, if the unit detection device 162 does not detect the expected number of canisters 94 to be present, the semi-automated canister distribution system 10 may not proceed with the transaction and/or may direct the user to move the canister(s) 94 into the field of view of the unit detection device 162, and/or notify the operator 92 about a need of assistance. In one embodiment, the area that comprises the field of view of the unit detection device 162 may be outlined on the ground outside of the cabinet 12 by means of painting lines or placement of targets, marks, etc. In one embodiment, the unit detection device 162 is implemented as one or more LiDAR devices, one or more cameras 14, one or more proximity sensors, and/or one or more light barrier sensors.

The auto-count system 160 may use the one or more unit detection device 162 to determine how many canisters 94 are removed from, or returned to, the second compartment 44 of the cabinet. For example, the one or more unit detection device 162 may determine that weight has been removed from the second compartment 44 and the auto-count system 160 may divide that weight by a known or predetermined weight of substantially full canisters 94 to determine the number of canisters 94 removed. In another example, the one or more unit detection device 162 may determine that weight has been added to the first compartment 42 and the auto-count system 160 may divide that weight by a known or predetermined weight of substantially empty canisters 94 to determine the number of canisters 94 returned.

In one embodiment, weight determination of returned or removed canisters 94 is based on a range of weights between the weight of a canister 94 that is completely empty of content and a canister 94 fully filled with content, such as propane.

The auto-count system 160 may communicate with the cabinet controller 19 which may transmit one or more signal to the system controller 200, the remote controller device 20, and/or the remote display 18 to alert the operator 92 if a number of canisters 94 that is different than the expected number of canisters 94 is returned and/or removed.

In one embodiment, the cabinet controller 19 may determine the expected number of canisters 94 that are to be returned and/or removed based on a data element entered into the human-machine interface 150. In one embodiment, the expected number of canisters 94 that are to be returned and/or removed is communicated to the auto-count system 160 from the cabinet controller 19, the remote controller device 20, and/or the remote display 18.

In one embodiment, the system controller 200 may record count information regarding the number of canisters 94 returned and/or removed from the cabinet 12 in connection with vending information, such as the time and day of the transaction. The system controller 200 may store the count information and the purchase information.

In one embodiment, the system controller 200 receives inventory data from the cabinet controller 19 of the cabinet system 11 indicative of the number of canisters 94 in the cabinet system 11. The inventory data may contain information as to the location of the canisters 94 (for example, in which of the first compartment 42 or second compartment 44). The inventory data may contain information as to the number of returned (substantially empty) canisters 94 and/or the number of substantially full canisters 94 in the cabinet system 11. The system controller 200 may compile and track such inventory data.

In one embodiment, as shown in FIGS. 1 and 2, the human-machine interface 150 of the cabinet system 11 of the semi-automated canister distribution system 10 may further comprise an audio system 170. The audio system 170 may be positioned on or near the cabinet 12. The audio system 170 may be connected to the remote controller device 20 and/or the remote display 18 and/or the cabinet controller 19. The audio system 170 may comprise one or more speakers 172 and one or more audio file controller 174. In one embodiment, the audio file controller 174 may share components, space, or functions with the cabinet controller 19.

The audio system 170 may broadcast audio, non-exclusive examples of which include instructions, thanks, alerts, counts, number of canisters 94 to be returned/withdrawn, number of canisters 94 actually returned/withdrawn, and/or advertising (for example, advertising related products).

In one embodiment, audio files may be recorded by the remote controller device 20 and be transmitted to the audio system 170 for broadcast through the speakers 172. In one embodiment, the remote controller device 20 records audio when an icon on the remote display 18 is activated. In one embodiment, the remote controller device 20 may accept an input of text and generate audio files from the text. A plurality of audio files may be recorded and/or generated. In one embodiment, the audio file may be provided from an outside source (for example, the remote management entity 180 described below), rather than the remote controller device 20. The audio file controller 174 may control the times and order of playing of the audio files through the speakers 172. The plurality of audio files may be played in an order or randomly.

In one embodiment, the audio system 170 further comprises one or more proximity sensor 176 positioned on or near the cabinet 12. The audio system 170 may receive a signal from the proximity sensor 176 indicative of the presence of a user in proximity to the cabinet 12. The audio system 170 may use receipt of the signal as a trigger to begin playing audio files through the speakers 172 by the audio file controller 174.

In one embodiment, the audio system 170 may use receipt of a signal from the human-machine interface 150 and/or the signaling device 80 as a trigger to begin playing audio files through the speakers 172 by the audio file controller 174.

The remote display 18 may have a screen for displaying information to the operator 92. For example, but not by way of limitation, the remote display 18 can be implemented as a computer monitor, a cell phone display, a tablet display, a website, a projector, a laptop monitor, and combinations thereof.

In one embodiment, the remote display 18 is a touch screen display. In this embodiment, the touch screen display forms an input device and the display. The touch screen display may be equipped with a graphical user interface (GUI) capable of communicating information to the user and receiving instructions from the user.

In one embodiment, the remote display 18 is in communication with the at least one camera 14 directly and/or through the cabinet controller 19 for receiving and displaying a real-time visual feed from the at least one camera 14. The remote display 18 may receive information from the at least one camera 14 and/or the remote controller device 20 and/or the cabinet controller 19, and transmit the information to an observer, such as operator 92, such that the information can be perceived by the observer.

In one embodiment, the remote controller device 20 may be integrated with the remote display 18. For example, the remote controller device 20 and the display may be components of a desktop computer, a tablet computer, a smart phone, a laptop computer, and/or a mobile computing device.

In one embodiment, the remote controller device 20 comprises a processor 21, a memory 22, and an input device 23 to receive input from a user (including, but not limited to, operator 92). In one embodiment, the input device 23 may be a function of and/or a component of the remote display 18.

The remote controller device 20 may comprise one or more memories 22 and one more processors 21, which will be referred to hereinafter in the singular for purposes of clarity. The memory 22 and the processor 21 can be stand-alone, partially or completely network-based or cloud-based, and may be located in a single physical location or in multiple physical locations. For example, a portion of the memory 22 may be a cloud-based memory.

The processor 21 is capable of executing processor executable code stored on the memory 22 and/or or creating, manipulating, altering, and storing computer data structures into the memory 22. The processor 21 can be implemented as a single processor 21 or multiple processors 21 working together to execute the logic described herein. Exemplary embodiments of the processor 21 include a digital signal processor (DSP), a central processing unit (CPU), a field programmable gate array (FPGA), a microprocessor, a multi-core processor, and/or combinations thereof.

The memory 22 stores processor executable code for causing the processor 21 to implement functions described herein. The memory 22 may be implemented as any conventional non-transitory computer memory, such as random access memory (RAM), a CD-ROM, a hard drive, a solid state drive, a flash drive, a memory card, a DVD-ROM, a floppy disk, an optical non-transitory drive (such as a compact disc), a compact flash drive, holographic drives, and combinations thereof, for example.

The remote controller device 20 may be in communication with the cabinet controller 19 which is in communication with the door lock system 60 of the cabinet 12 and may signal the door lock system 60 in order to change the first door 46 and/or the second door 48 between the locked state and the unlocked state, such that the lock is activated or deactivated. More particularly, the remote controller device 20 may be in communication with the cabinet controller 19 which is in communication with the door lock system 60, such as to signal the first door lock 66 to lock or unlock to change the first door 46 between the locked state and the unlocked state, and/or to signal the second door lock 70 to lock or unlock to change the second door 48 between the locked and unlocked state.

In one embodiment, the remote controller device 20 may transmit one or more signal to the system controller 200 indicative of the data element that may be accepted by the cabinet controller 19 through the human-machine interface 150 when presented by the purchaser 82 in order for the cabinet controller 19 to trigger the door lock system 60 to disengage the first and/or second door lock 66, 70.

In one embodiment, signaling between the remote controller device 20 and the cabinet controller 19 may be full duplex. In one embodiment, signaling between the remote controller device 20 and the cabinet controller 19 may utilize polling, where the remote controller device 20 polls the status of the cabinet controller 19 periodically.

The remote display 18 and the remote controller device 20 may be in communication with the cabinet controller 19 and/or the door lock system 60, the at least one camera 14, and/or the at least one user-verification camera 90 through the network 72 and/or the wireless access point 71. The computer network 72 may be wired and/or wireless.

In one embodiment, the remote controller device 20 and/or the remote display 18 may be incorporated into a Point-of-Sale device 130 used by the operator 92 for sales of other goods. The semi-automated canister distribution system 10 may utilize a receipt generated by the Point-of-Sale device 130 as the data element to identify and authenticate the purchase transaction from the semi-automated canister distribution system 10. As a non-exclusive example, the purchaser 82 may utilize the human-machine interface 150 to enter the data element, such as by scanning the receipt, scanning a bar code on the receipt, or entering a set of digits from the receipt as the data element, for example.

In one embodiment, the remote controller device 20 may intercept one or more signals from the Point-of-Sale device 130, the signals indicative of a purchase transaction made by the purchaser 82 through the Point-of-Sale device.

In one embodiment, the remote controller device 20 and/or the Point-of-Sale device 130 may transmit one or more signal to the system controller 200 indicative of the data element that may be accepted by the cabinet controller 19 through the human-machine interface 150 when presented by the purchaser 82 as authorization of the purchase transaction at the cabinet systems 11.

In one embodiment, the remote controller device 20 may directly process a purchase transaction made by the purchaser 82.

In one embodiment, the purchaser 82 may receive a data element from another source besides the operator 92, for example, the distributer of the canisters 94 that may be used to authenticate a transaction through the semi-automated canister distribution system 10. As a non-exclusive example, the purchaser 82 may discover a faulty canister 94 and may wish to exchange the faulty canister 94 for a functional, substantially full canister 94. The purchaser 82 may contact the distributor and the distributor may provide the purchaser 82 with the data element, such as a code. The distributor may signal the system controller 200 with information indicative of the data element and the transaction. The system controller 200 may transmit one or more signal to the cabinet controller 19 with information indicative of the data element and the transaction. The purchaser may then enter the data element into the human-machine interface 150 which may signal the cabinet controller 19 which may recognize the data element and proceed to exchange and dispense the authorized canister(s) 94.

In one embodiment, the cabinet controller 19 may comprise one or more computer processing device. The cabinet controller 19 may comprise one or more memories 22 and one more processors 21, which will be referred to hereinafter in the singular for purposes of clarity. The memory 22 and the processor 21 can be stand-alone, partially or completely network-based or cloud-based, and may be located in a single physical location or in multiple physical locations. For example, a portion of the memory 22 may be a cloud-based memory.

The processor 21 is capable of executing processor executable code stored on the memory 22 and/or or creating, manipulating, altering, and storing computer data structures into the memory 22. The processor 21 can be implemented as a single processor 21 or multiple processors 21 working together to execute the logic described herein. Exemplary embodiments of the processor 21 include a digital signal processor (DSP), a central processing unit (CPU), a field programmable gate array (FPGA), a microprocessor, a multi-core processor, and/or combinations thereof.

The memory 22 stores processor executable code for causing the processor 21 to implement functions described herein. The memory 22 may be implemented as any conventional non-transitory computer memory, such as random access memory (RAM), a CD-ROM, a hard drive, a solid state drive, a flash drive, a memory card, a DVD-ROM, a floppy disk, an optical non-transitory drive (such as a compact disc), a compact flash drive, holographic drives, and combinations thereof, for example.

Figure 22:
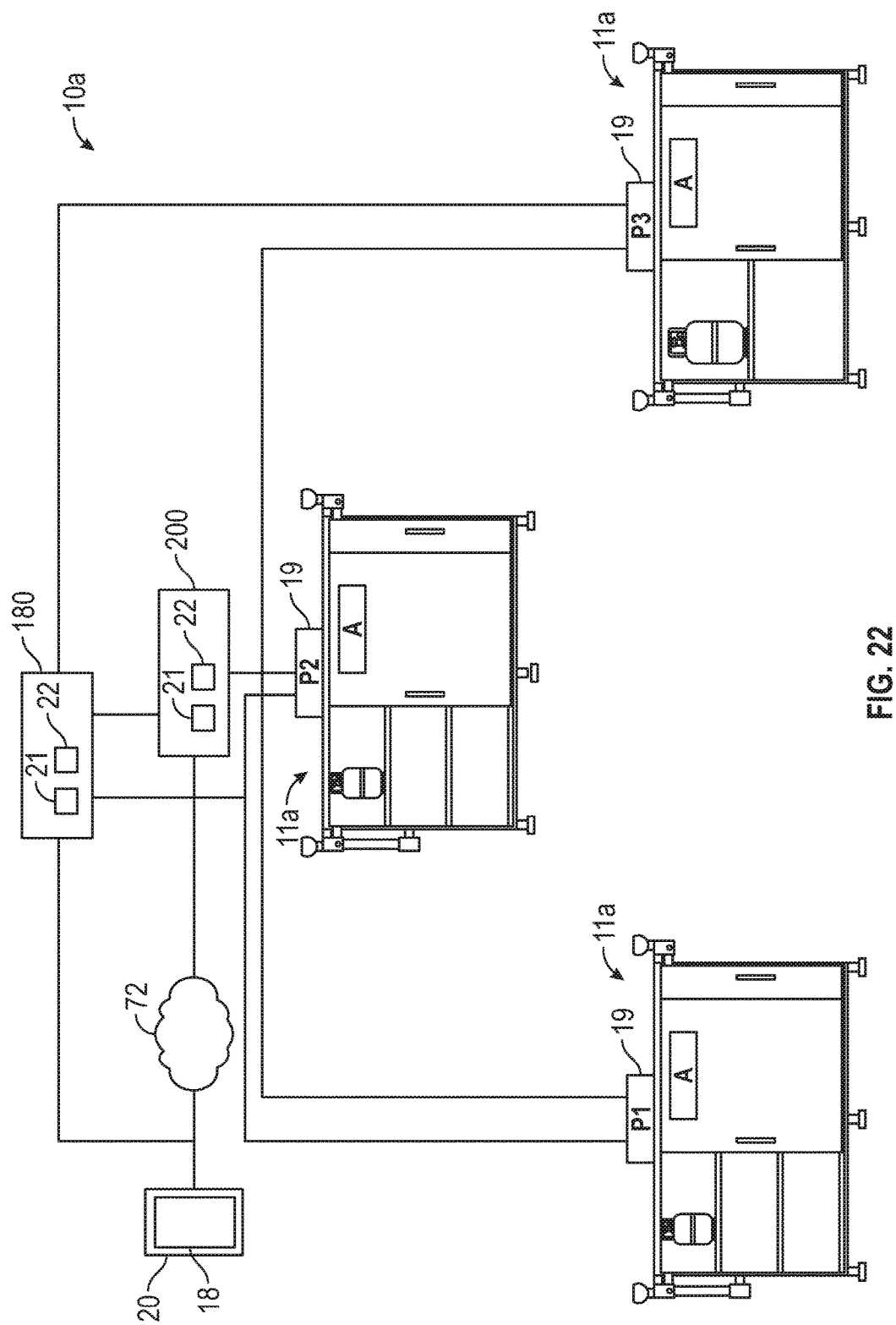
FIG. 22 is a schematic diagram of an exemplary embodiment of a semi-automated canister distribution system in accordance with the present disclosure.
Figure 23:
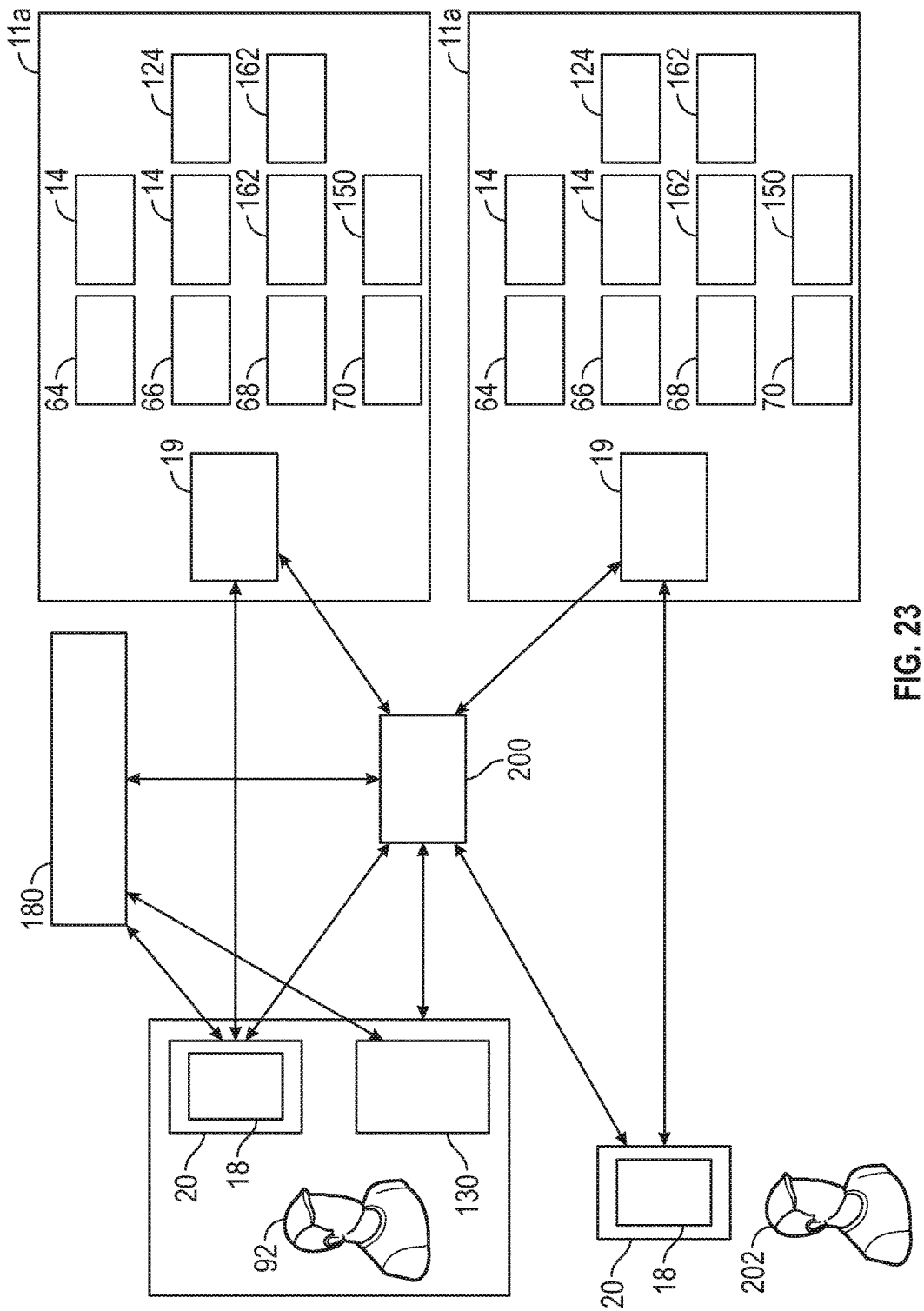
FIG. 23 is a schematic diagram of an exemplary embodiment of a semi-automated canister distribution system in accordance with the present disclosure.

As shown in FIGS. 22-23, in one embodiment, a semi-automated canister distribution system 10a in accordance with the present disclosure may comprise one or more cabinet systems 11a. In one embodiment, the semi-automated canister distribution system 10a may comprise one or more cabinet systems 11a. The cabinet systems 11a are substantially similar to the cabinet system 11, except as described herein below.

In one embodiment, the one or more cabinet systems 11a may be two or more cabinet systems 11a and the human-machine interface 150 may be shared by the two or more cabinet systems 11a within the semi-automated canister distribution system 10a. In one embodiment, the human-machine interface 150 may comprise one or more of a camera 14, a proximity sensor, a microphone, a display, signage, lightable signage, a keypad, and a speaker. In one embodiment, the human-machine interface 150 may be detached from the cabinet systems 11a. For example, the human-machine interface 150 may be located on a detached pedestal or post or wall location. The human-machine interface 150 may be in communication with the remote controller device 20, the cabinet controller 19, and/or the system controller 200.

In one embodiment, the one or more cabinet systems 11a is two or more cabinet systems 11a and the two or more cabinet systems 11a may be chained together and/or controlled individually and/or controlled jointly by the remote controller device 20.

In one embodiment, the semi-automated canister distribution system 10a further comprises a remote management entity 180. In one embodiment, the remote management entity 180 may comprise one or more computing device that executes system logic and is in communication with one or more of the system controller 200, the cabinet controller 19, and the remote controller device 20.

The remote management entity 180 may be located in a separate location from the other components of the semi-automated canister distribution system 10a. In one embodiment, the remote management entity 180 may comprise a computer server. In one embodiment, the remote management entity 180 may be a distributed system such as a cloud computing device. In one embodiment, the remote management entity 180 may comprise one or more memories 22 and one more processors 21, which will be referred to hereinafter in the singular for purposes of clarity. The memory 22 and the processor 21 can be stand-alone, partially or completely network-based or cloud-based, and may be located in a single physical location or in multiple physical locations. For example, a portion of the memory 22 may be a cloud-based memory.

In one embodiment, the semi-automated canister distribution system 10a further comprises a system controller 200. The system controller 200 may comprise one or more computing device that executes system logic and manages and controls the cabinet systems 11a within the semi-automated canister distribution system 10a and communicates with the remote controller device 20 and/or the remote display 18.

In one embodiment, the cabinet controller 19 may share components with the system controller 200. In one embodiment, the cabinet controller 19 and the system controller 200 are physically located together. In one embodiment, the cabinet controller 19 and the system controller 200 are physically separate.

In one embodiment, the system controller 200 may communicate with the one or more cabinet systems 11*a*, the cabinet controller 19, the remote controller device 20, and/or the remote display 18 through a wireless or wired network. The cabinet systems 11*a* may further comprise receivers and transmitters for communication with the system controller 200 and/or each other. The receivers and transmitters may be wireless and/or wired connections. The cabinet systems 11*a* may be connected through one or more wireless or wired networks and may have one or more wireless access points.

In one embodiment, the system controller 200 receives inventory data from one or more of the cabinet systems 11*a* indicative of the number of canisters 94 in each cabinet system 11*a*. The inventory data may contain information as to the location of the canisters 94 (for example, in which cabinet system 11*a* and/or in which of the first compartment 42 or second compartment 44 of the cabinet system 11*a*). The inventory data may contain information as to the number of returned (substantially empty) canisters 94 and/or the number of substantially full canisters 94 in each cabinet system 11*a*, and in the semi-automated canister distribution system 10*a* as a whole. The system controller 200 may compile and track such inventory data.

In one embodiment, the remote controller device 20 may transmit one or more signal to the system controller 200 indicative of the data element that may be accepted by the cabinet controller 19 through the human-machine interface 150 when presented by the purchaser 82 in order for the cabinet controller 19 to trigger the door lock system 60 to disengage the first and/or second door lock 66, 70. As previously described, the data element may be any designated data that is predetermined such that the cabinet system 11 recognizes the purchase transaction. Non-exclusive examples of the data element include one or more of a code, an audio signal, facial recognition, bio-metrics, and so on. Where appropriate, the data element may be given to the purchaser 82.

In one embodiment, the system controller 200 through the cabinet controller 19 and the human-machine interface 150 may direct the purchaser 82 to a particular compartment 42, 44 of a particular cabinet system 11*a* to place a returned canister 94 based on the inventory data. In one embodiment, the system controller 200 through the cabinet controller 19 and the human-machine interface 150 may direct the purchaser 82 to a particular compartment 42, 44 of a particular cabinet system 11*a* to pick up a substantially full canister 94 based on the inventory data. The cabinet system 11*a* for the returned canister 94 and the cabinet system 11*a* for the canister 94 to pick up may be different cabinet systems 11*a* within the two or more cabinet systems 11*a* of the semi-automated canister distribution system 10*a*.

In one embodiment, the cabinet system 11*a* may comprise the cabinet 12 and the cabinet controller 19. As previously described in relation to the cabinet system 11, the cabinet controller 19 may comprise a computing device that interfaces with one or more other components of the cabinet system 11*a*. In one embodiment, the cabinet system 11*a* may further comprise the lock system 60, the auto-count system 160, and/or at least one camera 14. In one embodiment, the cabinet system 11*a* may further comprise the human-machine interface 150.

As previously described, the cabinet 12 may have the first compartment 42 and the second compartment 44. In the cabinet system 11*a*, the first compartment 42 may be used to dispense a canister 94 that is substantially full or may be used to receive a return of a canister 94. Likewise, the second compartment 44 may be used to dispense a canister 94 that is substantially full or may be used to receive a return of a canister 94. In one embodiment, both the first and second compartments 42, 44 of a particular cabinet 12 are designated to receive substantially empty canisters 94. In one embodiment, both the first and second compartments 42, 44 of a particular cabinet 12 are designated to receive substantially full canisters 94.

In one embodiment, one of the cabinet systems 11*a* of the two or more cabinet systems 11*a* of the semi-automated canister distribution system 10*a* may have a cabinet 12 with shelves 96 positioned in the cabinet 12 to accommodate a first size of canister 94 and the other of the cabinet systems 11*a* of the two or more cabinet systems 11*a* of the semi-automated canister distribution system 10*a* may have a cabinet 12 with shelves 96 positioned in the cabinet 12 to accommodate a second size of canister 94. In one embodiment, each of the two or more cabinet systems 11*a* may have a cabinet 12 with shelves 96 positioned in the cabinet 12 to accommodate the same size of canister 94.

For example, the semi-automated canister distribution system 10*a* may comprise three cabinets systems 11*a*, with a first and a second of the cabinet systems 11*a* having a cabinet 12 arranged to hold canisters 94 of twenty-pound size, and with a third of the cabinet systems 11*a* having a cabinet 12 arranged to hold canisters 94 of thirty-pound size. In another example, one cabinet 12 of the two or more cabinet systems 11*a* may have the capacity to contain eighteen canisters 94 of a twenty-pound size in the first compartment 42 and eighteen canisters 94 of a twenty-pound size in the second compartment 42.

As previously discussed in relation to cabinet system 11, in one embodiment, the shelves 96 of the cabinets 12 may be adjustable and/or removable, which allows variance in the number and spacing of shelves 96 in order to accommodate different sizes of canisters 94.

In one embodiment, each of the cabinet systems 11*a* of the semi-automated canister distribution system 10*a* may have a unique identifier distinguishing the cabinet systems 11*a* from one another. For example, the cabinet systems 11*a* may be identified with an alpha or alpha numeric code, such as "P1", "P2", "P3", etc.

In one embodiment, each of the first door 46 and second door 48 of the cabinets 12 of the cabinet systems 11*a* may have an identifier to distinguish the first door 46 from the second door 48 for a particular cabinet 12. For example, the first door 46 and the second door 48 may be designated "A" and "B", or "1" and "2", or red and green, etc., respectively. In one embodiment, the identifier distinguishes both the doors 46, 48 and the compartments 42, 44 of the cabinet 12.

In one embodiment, the semi-automated canister distribution system 10*a* may further comprise a local area network through which the cabinet controllers 19, the system controller 200, and the remote controller device 20 communicate. In one embodiment, the semi-automated canister distribution system 10*a* may further comprise a wide area network through which the remote management entity 180, the system controller 200, the cabinet controller 19, and/or the remote controller device 20 communicate.

In one embodiment, a technician 202 may access the semi-automated canister distribution system 10*a*, the remote controller device 20, the system controller 200, and/or the cabinet controller 19 through the local computer network. Of course, it will be understood that the technician 202 may also access the semi-automated canister distribution system 10a and/or components thereof directly without utilizing the local computer network. In one embodiment, the remote controller device 20 may be a first remote controller device 20 used by the operator and the technician 202 may have a second remote controller device 20.

In one embodiment, the system controller 200 may store in the memory 22 a log of activity of the semi-automated canister distribution system 10, 10a. For example, the system controller 200 may store the transaction of the purchaser 82, such as the return of one or more canister 94, the removal of one or more canister 94, failure to return or remove the expected number of canisters 94, status of the door lock system 60, time of one or more transaction, date of one or more transaction, inventory levels, inventory locations, and so on. In one embodiment, the system controller 200 may store images and/or video from the camera(s) 14 and/or may store audio data and/or sensor data. The operator 92 and/or the technician 202 may access the log of activity, the images, video, audio data, and/or sensor data. In one embodiment, the operator 92 and/or the technician 202 may access the log of activity through the remote controller device 20, through the Point-of-Sale device 130, through the system controller 200, and/or through the remote management entity 180.

Returning now to FIGS. 1-3, an example of one embodiment of the semi-automated canister distribution system 10 in use in accordance with the present disclosure will be described.

In use, the operator 92, such as a cashier in a store, sells a propane canister 94 to the purchaser 82 in the store. The sale may occur at the Point-of-Sale device 130, such as a cash register. The purchaser 82 may indicate whether the purchaser 82 wishes to exchange an empty propane canister 94 for a propane canister 94 filled with propane, or wishes to simply buy a propane canister 94 filled with propane without exchange of an empty propane canister 94, or a combination of purchase with an exchange and purchase without an exchange. Unlike payments for goods kept within the store, the payment for the canister 94 occurs before the canister 94 is distributed to the purchaser 82, since the canister 94 is kept outside of the store.

After payment to the operator 92, the purchaser 82 moves to the cabinet 12, typically at a remote location from the point of sale, such as outside of the store. In one embodiment, the purchaser 82 then activates the at least one signaling device 80, for example, by depressing the first button. The signaling device 80 may transmit one or more signal indicative of the presence of the purchaser 82 through the cabinet controller 19 to the remote controller device 20 and/or the remote display 18.

In one embodiment, the user-verification camera 90 and/or the at least one camera 14 captures one or more image of the purchaser 82 and transmits the image and/or a live video feed through the cabinet controller 19 to the remote display 18. In one embodiment, the operator 92 visually verifies the presence of the purchaser 82 and/or identity of the purchaser 82 using the image and/or the live video feed on the remote display 18. In one embodiment in which the at least one camera 14 and/or the user-verification camera 90 is motion activated, motion of the purchaser 82 may trigger the transmission of the signal indicative of the presence of the purchaser 82.

In the case where multiple purchasers 82 have purchased canisters 94 within a short amount of time, the operator 92 may utilize the image(s) and/or the live video feed to verify the identity of the purchaser 82 at the cabinet 12 to determine the appropriate transaction for each purchaser 82 based on the transaction of that purchaser 82.

In the case in which the purchaser 82 has an empty propane canister for exchange, the operator 92 may use the remote controller device 20 to send a signal through the cabinet controller 19 to the first door lock 66 of the door lock system 60 to unlock the first door lock 66. The purchaser 82 may then open the first door 46 and place the canister 94 for exchange in the first compartment 42. In one embodiment, the first door sensor 64 may transmit a signal through the cabinet controller 19 and the cabinet controller 19 may transmit a signal to the remote controller device 20 and/or the remote display 18 indicative of the open position of the first door 46. The operator 92 may monitor the purchaser's return of the canister 94 using the video feed to the remote display 18 from the at least one camera 14 and/or the at least one user-verification camera 90.

The purchaser 82 may then close the first door 46, or the first door 46 may be automatically closed (such as when the first door 46 is self-closing). The first door sensor 64 may transmit a signal to the cabinet controller 19 and the cabinet controller 19 may transmit a signal to the remote controller device 20 and/or the remote display 18 indicative of the closed state of the first door 46. The operator 92 may verify the closed state of the first door 46 by using the video feed from the at least one camera 14 on the remote display 18, for example.

The first door 46 may lock automatically when the first door 46 is moved to the closed position. Alternately, the operator 92 may lock the first door 46 using the remote controller device 20 to transmit a signal through the cabinet controller 19 to signal the first door lock 66 such that when the first door 46 is moved to the closed position the first door lock 66 is engaged, and/or when the remote display 18 and/or the remote controller device 20 receive the signal from the cabinet controller 19 that the first door 46 is in the closed position.

Next, the purchaser 82 moves to the second compartment 44. Of course, it will be understood that the purchaser 82 may move directly to the second compartment 44 if the purchaser does not have a canister 94 for exchange.

In one embodiment, the at least one user-verification camera 90 and/or the at least one camera 14 captures at least one image of the purchaser 82 and transmits the image and/or a live video feed to the cabinet controller 19 which transmits the information to the remote display 18. In one embodiment in which the at least one camera 14 and/or the user-verification camera 90 is motion activated, motion of the purchaser 82 triggers the transmission of the signal indicative of the presence of the purchaser 82. In one embodiment, in which the purchaser 82 exchanged an empty canister, the operator 92 may monitor the purchaser's movement to the second compartment 44 utilizing the at least one user-verification camera 90 and/or the at least one camera 14.

The operator 92 uses the remote controller device 20 to send a signal through the cabinet controller 19 which transmits the information to the second door lock 70 of the door lock system 60 to unlock the second door lock 70. The purchaser 82 may then open the second door 48 and remove the canister 94 filled with propane from the second compartment 44. In one embodiment, the second door sensor 64 may transmit a signal to the cabinet controller 19 which transmits the information to the remote controller device 20 and/or the remote display 18 indicative of the open position of the second door 48. The operator 92 may monitor the purchaser's removal of the canister 94 using the video feed from the at least one camera 14 to the remote display 18.

The purchaser 82 may then close the second door 48, or the second door 48 may be automatically closed (such as when the second door 48 is self-closing). The second door sensor 68 may transmit a signal to the cabinet controller 19 which transmits the information to the remote controller device 20 and/or the remote display 18 indicative of the closed position of the second door 48.

The operator 92 may verify the closed state of the second door 48 by using the video feed from the at least one camera 14 on the remote display 18, for example. The second door 48 may lock automatically when the second door 48 is moved to the closed position. Alternately, the operator 92 may lock the second door 48 using the remote controller device 20 to transmit a signal to the cabinet controller 19 to signal the second door lock 70 such that when the second door 48 is moved to the closed position the second door lock 70 is engaged, and/or when the remote display 18 and/or the remote controller device 20 receive the signal that the second door 48 is in the closed position.

In one embodiment, the operator 92 may manually disengage, lock, and/or unlock the first door 46 and/or the second door 48 with the manual override device 76, such as in the case of a power failure to the semi-automated canister distribution system 10.

In one embodiment, the human-machine interface 150 may be used to allow the operator 92 to issue a data element to the purchaser 82 indicative of the particular purchase, by which the purchaser 82 can have access to the cabinet 12, without the operator 92 having to open the cabinet 12 with the remote controller device 20. The operator 92 may monitor the actions of the purchaser 82 as well as over-ride them. For example, the operator 92 issues the purchaser 82 the data element, such as a code. The purchaser 82 enters the code into the human-machine interface 150, such as a keypad, on the cabinet 12. The human-machine interface 150 may communicate via one or more signal indicative of the data element to the cabinet controller 19. The cabinet controller 19 may trigger the door lock system 60 to disengage the first and/or second door lock 66, 70, such that the first and/or second door 46, 48 are in the unlocked state.

In one embodiment, the audio system 170 plays audio files through the speakers 172, such as instructions, advertisements, and/or thanks, when the purchaser 82 enters the code and/or when the purchaser 82 is within proximity to the cabinet 12. The audio system 170 may be controlled by, or a part of, the cabinet controller 19.

In one embodiment, the auto-count system 160 determines that the correct number of canisters 94 have been returned before the door lock system 60 is triggered to unlock the second compartment 44 for distribution of new canisters 94. In one embodiment, the auto-count system 160 determines that an incorrect number of canisters 94 has been returned and/or removed and alerts the operator 92 through the remote controller device 20 and/or the remote display 18. The cabinet controller 19 may record the area around the cabinet 12 with camera 14 and/or 90 and display the captured video and/or images from camera 14 on remote display 18. The system controller 200 may store the video and/or images for future review.

Returning now to FIGS. 22-23, the semi-automated canister distribution system 10a in use will now be described.

If one compartment 42 or 44 of each cabinet 12 is designated for returned canisters 94, the maximum capacity of the cabinet 12 to dispense full canisters 94 is limited to the capacity of one compartment 42 or 44. For example, the cabinet 12 may be limited to eighteen of the twenty-pound size canisters 94. In many cases, it is not cost effective to maintain such a low number of available canisters 94, such as in retail locations that sell a large number of canisters 94 on a frequent basis.

Because of the possibility of a multiple number of cabinets 12 in the semi-automated canister distribution system 10a, one compartment 42 or 44 of each cabinet 12 does not have to be reserved for returned canisters 94. The semi-automated canister distribution system 10a may designate a lesser number than half of the compartments 42, 44 of the cabinets 12 of two or more cabinet systems 11a for returned canisters 94. A larger proportion of the compartments 42, 44 may be designated for dispensing full canisters 94. For example, when the one or more cabinet systems 11a are two cabinet systems 11a, one cabinet system 11a may have both the first and second compartments 42, 44 designated for full canisters 94, and the second cabinet system 11a may have one of the first or second compartments 42, 44 designated for full canisters 94. In such a case, for a capacity of eighteen canisters 94 per compartment, the semi-automated canister distribution system 10a would have a capacity of a quantity of fifty-two of the twenty-pound full canisters 94 and a quantity of eighteen of the twenty-pound returned canisters 94.

In one embodiment, the number of compartments 42, 44 designated for dispensing substantially full canisters 94 and the number of compartments 42, 44 designated for receiving substantially empty canisters 94 may be adjusted by the system controller 200. In one embodiment, the system controller 200 may adjust the number of compartments 42, 44 designated for receiving or dispensing canisters 94 based at least in part on past volume of each type of transaction and/or current inventory of substantially full and/or substantially empty canisters 94.

In one embodiment, the operator 92 may direct the purchaser 82 to return and/or pick up canisters 94 to and from multiple cabinets 12. In one embodiment, the operator 92 may observe the purchaser 82 through the one or more cameras 14 to direct the purchaser 82 to return and/or pick up canisters 94 to and from multiple compartments 42, 44 and/or cabinets 12 in the two or more cabinet systems 11.

In one embodiment, the semi-automated canister distribution system 10a may direct the purchaser 82 to return and/or pick up canisters 94 to and from multiple cabinets 12. Given system-wide inventory control, the operator 92 may not know if the semi-automated canister distribution system 10a can satisfy the purchase criteria. The system controller 200 of the semi-automated canister distribution system 10a may determine whether the purchase criteria can be satisfied based on the quantity of return canisters 94 the purchaser 82 wishes to return, the quantity of full canisters 94 the purchaser has purchased, the inventory of returned canisters 94, and/or the inventory of full canisters 94 in the semi-automated canister distribution system 10a.

The semi-automated canister distribution system 10a may utilize the human-machine interface 150 and/or the audio system 170 to communicate directions to the purchaser 82 as to which cabinets 12 and which compartments 42, 44 to use. The directions may be based on the quantity of return canisters 94 the purchaser 82 wishes to return, the quantity of full canisters 94 the purchaser 82 has purchased, the inventory of returned canisters 94, and/or the inventory of full canisters 94 in the semi-automated canister distribution system 10a.

For example, the purchaser 82 may purchase two twenty-pound canisters 94, with two twenty-pound canisters 94 for return, and one thirty-pound canister 94 with no return of that size. Of course, the example is purely for explanatory purposes, and the purchase may comprise any combination of canister returns and pickups, of the same or varying sizes.

The operator 92 may enter the transaction into the remote controller device 20, or other connected Point-of-Sale device 130, or remote management entity 180. The remote controller device 20 or other connected Point-of-Sale device 130 or remote management entity 180 may communicate the purchase details to the system controller 200. The system controller 200 may check the inventory and locations of empty and full canisters 94 in the one or more cabinet systems 11a.

The system controller 200 may identify the compartment(s) 42, 44 of the cabinets 12 appropriate for certain size canister 94 returns and pickups based on information regarding the inventory in the one or more cabinet systems 11a.

For example, in an embodiment in which the one or more cabinet systems 11a is three cabinet systems 11a, a first cabinet system 11a may be identified as "P1" and contain one or more twenty-pound canisters, a second cabinet system 11a may be identified as "P2" and contain one or more twenty-pound canisters, and a third cabinet system 11a may be identified as "P3" and contain one or more thirty-pound canisters. Of course, it will be understood that the first compartment 42 may contain different size canisters 94 than the second compartment 44 of the cabinet system 11a.

The purchaser 82 may present the data element that is an identification of the purchase (for example, a PIN code, or a voice command, and/or some other form of authorization information) at the human-machine interface 150 of one of the cabinet systems 11a in the semi-automated canister distribution system 10a. The system controller 200, through the human-machine interface 150, may direct the purchaser 82 as to which compartment 42, 44 in which cabinet 12 the purchaser should return the empty canisters 94 and pick up the full canisters 94.

When the purchaser 82 approaches the cabinet 12 to which she is directed to return the substantially empty canisters 94, the cabinet system 11a may use the one or more unit detection devices 162 of the auto-count system 160 to determine the existence and number of the substantially empty canisters 94 being returned. The unit detection device 162 may detect the presence of the canister 94 outside of the cabinet 12 before the door lock 66, 70 is unlocked, and/or may detect the presence of the returned canister placed in the cabinet 12. The cabinet controller 19 may transmit one or more signals indicative of the existence and number of the substantially empty canisters 94 being returned to the system controller 200. In one embodiment, after the purchaser 82 returns the substantially empty canisters 94, the system controller 19 may transmit one of more signal through the cabinet controller 19 and the human-machine interface 150 to direct the purchaser 82 as to where to pick up the substantially full canisters 94.

When the purchaser 82 approaches the cabinet 12 to which she is directed to pick up the full canisters 94, the cabinet system 11a may use the one or more unit detection devices 162 of the auto-count system 160 to determine the number of the substantially full canisters 94 removed. The cabinet controller 19 may transmit one or more signals indicative of the number of the substantially full canisters 94 removed to the system controller 200. The signals may be indicative of the identity of the cabinet 12 and/or the compartment 42, 44 used.

In one embodiment, the purchaser 82 may identify the transaction through the human-machine interface 150 with the data element from the operator 92 (for example, using a PIN on a keypad) on one of the cabinet systems 11a. The cabinet controller 19 of the cabinet system 11a may transmit one or more signals indicative of the transaction to the system controller 200. The system controller 200 may determine, or may have previously determined, to which compartments 42, 44 of which cabinets 12 to direct the purchaser 82. The system controller 200 may then send these instructions to the cabinet controller 19 of the cabinet 12 at which the purchaser 82 is standing. The cabinet controller 19 may then use the human-machine interface 150 to communicate these instructions to the purchaser 82. In one embodiment, the system controller 200 may choose the content of the communication based on which cabinet system 11a the purchaser 82 approaches.

Expanding on the example above in which the purchaser 82 wishes to return two twenty-pound canisters 94 and pick up two twenty-pound canisters 94 and one thirty-pound canister 94, the human-machine interface 150 of any one of the cabinet systems 11a may be used to communicate the following to the purchaser 82:

Cabinet P1—20 lb
Cabinet P2—20 lb
Cabinet P3—30 lb

In one embodiment, the system controller 200 may use the human-machine interface 150 of the cabinet controller 19 to communicate data elements for each part of the transaction and/or for the entire transaction. For example, the human-machine interface 150 may communicate a PIN 3322 for the exchange and return of two twenty-pound canisters 94, as in the example. The purchaser 82 may be instructed through the human-machine interface 150 to approach the cabinet 12 labeled with the identifier "P1" and enter PIN 3322 into the human-machine interface 150 of that cabinet system 11a.

In the event the purchaser 82 presents the data element at the wrong cabinet system 11a (that is, a cabinet system 11a other than the cabinet system 11a to which the purchaser 82 should return or pick up the canister 94 based on the system controller 200), the cabinet controller 19 of the cabinet system 11a may transmit one or more signal to the system controller 200 indicative of the attempted entry. The system controller 200 may communicate through the cabinet controller 19 and the human-machine interface 150 to direct the purchaser 82 to the appropriate cabinet system 11a.

When the purchaser 82 presents the data element at the appropriate cabinet system 11a, in this example "P1", the cabinet controller 19 may unlock the door lock 66, 70 of the door 46, 48 of the designated compartment 42, 44. The one or more unit detection devices 162 of the auto-count system 160 may detect the return of the substantially empty canister(s) 94. After the purchaser 82 returns the canisters 94, for example, when the door 46, 48 is detected to be in closed position, the cabinet controller 19 may determine if the expected return of the canisters 94 has occurred and/or may signal the lock system 60 to lock the door 46, 48 of the compartment 42, 44. The cabinet controller 19 of the cabinet system 11a may transmit one or more signal to the system controller 200 indicative of the transaction. In one embodiment, the one or more unit detection devices 162 of the auto-count system 160 may detect the presence of the substantially empty canister(s) 94 outside of the cabinet 12, before the canisters 94 are returned.

Next, the system controller 200 may transmit instructions back to the cabinet controller 19 of the cabinet system 11a to direct the purchaser 82 (through the human-machine interface 150) to remove the substantially full thirty-pound canister 94 from the appropriate cabinet system 11a, in this example the cabinet system 11a identified as "P3". When the purchaser 82 presents the data element at "P3", the cabinet controller 19 of the cabinet system 11a identified as "P3" may transmit one or more signals to the system controller 200. The system controller 200 may transmit one or more signals to the cabinet controller 19 of the cabinet system 11a identified as "P3" to proceed with dispensing the full canisters 94 by unlocking the door 46, 48 to the designated compartment 42, 44.

Next, the system controller 200 may transmit instructions back to the cabinet controller 19 of the cabinet system 11a to direct the purchaser 82 (through the human-machine interface 150) to proceed to the cabinet 12 labeled with the identifier "P2" and enter the PIN into the human-machine interface 150 of that cabinet system 11a. The instructions may further direct the purchaser as to which compartment 42, 44 from which to remove the canisters 94. The purchaser 82 may enter the PIN into the human-machine interface 150 of that cabinet system 11a identified as "P2". Then, the cabinet controller 19 of the cabinet system 11a identified as P2 may transmit one or more signals to the system controller 200. The system controller 200 may transmit one or more signals to the cabinet controller 19 of the cabinet system 11a identified as "P2" to proceed with dispensing the substantially full twenty-pound canisters 94 by unlocking the door 46, 48 to the designated compartment 42, 44.

The one or more unit detection devices 162 of the auto-count system 160 may detect the removal of the full canister(s) 94 from the cabinet system 11a. When the door 46, 48 is detected to be in closed position, the cabinet controller 19 may determine if the expected removal of canisters 94 has occurred and may transmit one or more signal to the system controller 200 indicative of the transaction.

If the cabinet controller 19 and/or the system controller 200 determines that an unexpected transaction occurs (for example, an unexpected number of canisters 94 returned or removed), the system controller 200 may alert the operator 92 and/or communicate the discrepancy to the purchaser 82.

Of course, it will be understood that the above examples are for explanatory purposes and that there are many permutations of purchases possible with the semi-automated canister distribution system 10a.

For exemplary purposes, the following is one embodiment of a sequence of automated steps conducted by the semi-automated canister distribution system 10a for the return of a canister 94:

Return Sequence:
1) Determine which compartment 42, 44 of which cabinet 12 to use for return.
2) Unlock the appropriate door 46, 48, of the appropriate compartment 42, 44.
3) Direct the purchaser to open the appropriate door 46, 48.
4) Detect the opened door 46, 48.
5) Detect the return of canister(s) 94.
   i) If the one or more unit detection devices 162 of the auto-count system 160 does not detect the expected return of the canister(s) 94, inform the purchaser 82 and/or the operator 92 and may not proceed with the transaction.
6) Direct the purchaser 82 to close door 46, 48.
7) Detect closed door 46, 48.
8) Lock door 46, 48.
9) Continue with any further return or pickup of canister(s) 94.

For exemplary purposes, the following is one embodiment of a sequence of automated steps conducted by the semi-automated canister distribution system 10a for the pickup of a full canister 94:

Pickup Sequence:
1) Determine which compartment 42, 44 of which cabinet 12 to use for pickup.
2) Unlock the appropriate door 46, 48 of the appropriate compartment 42, 44.
3) Direct the purchaser 82 to open the appropriate door 46, 48
4) Detect the opened door 46, 48.
5) Detect the removal of canister(s) 94.
   i) If the one or more unit detection devices 162 of the auto-count system 160 does not detect the expected number of canister(s) 94 removed, inform the purchaser 82 and/or the operator 92.
6) Direct the purchaser 82 to close the door 46, 48.
7) Detect the closed door 46, 48.
8) Lock the door 46, 48.
9) Continue with any further return or pickup of canister(s) 94.

In one embodiment, the semi-automated canister distribution system 10a may accommodate multiple purchasers 82 simultaneously.

While several embodiments of the inventive concepts have been described for purposes of this disclosure, it will be understood that numerous changes and combinations may be made which will readily suggest themselves to those skilled in the art and which are accomplished within the spirit of the inventive concepts disclosed and as defined in the appended claims.

CONCLUSION

Conventionally, the sale of canisters stored outside of retail locations has been problematic. For example, these sales required additional manpower and hampered the efficiency of retail sales. In accordance with the present disclosure, systems and methods for semi-automated canister distribution are disclosed that address these and other problems.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method for semi-automated distribution of one or more canister, comprising:
   receiving, by a remote controller device located in a store, information indicative of a purchase transaction from a purchaser for a return of a first canister and pickup of a second canister, the second canister stored in a second compartment of a cabinet system located outside of the store, the second compartment separated from a first compartment of the cabinet system, the first compartment having a first door and the second compartment having a second door, the first and second door having an open position and a closed position with a locked state and an unlocked state;
   receiving, by the remote controller device, a signal indicative of the purchaser being physically located in proximity to the cabinet system;
   transmitting a signal, with the remote controller device, to the cabinet system to change the first door from the locked state to the unlocked state; and
   transmitting, from the cabinet system, a real-time visual feed from at least one unit detection device of the cabinet system to a remote display located in the store, the unit detection device positioned to have a field of view encompassing at least a portion of an interior of the cabinet system when the first door or the second door is in the open position;
   monitoring, by an operator of the remote display, the purchaser returning the first canister to the first compartment;
   transmitting a second signal, with the remote controller device, to the cabinet system to change the second door from the locked state to the unlocked state; and
   monitoring, using the remote display, the purchaser retrieving the second canister from the second compartment.

2. The method of claim 1, wherein the at least one unit detection device is a first camera and a second camera, wherein the first camera is positioned relative to the cabinet system such that the first camera has a field of view encompassing at least a portion of an interior of the first compartment of the cabinet system when the first door is in the open position and the second camera is positioned relative to the cabinet system such that the second camera has a field of view encompassing at least a portion of an interior of the second compartment of the cabinet system when the second door is in the open position.

3. The method of claim 1, wherein the cabinet system is sized to accommodate at least two propane canisters.

4. The method of claim 1, wherein the at least one unit detection device is a first camera and at least one user verification camera positioned outside of and relative to the cabinet system such that the field of view of the user verification camera encompasses an area in proximity to the cabinet system.

5. The method of claim 1, further comprising at least one sensor positioned to determine when the first door and the second door are in the closed position.

6. The method of claim 1, wherein the at least one unit detection device is a least one camera having a field of view comprising an area in proximity to the cabinet system.

7. A method for semi-automated distribution of one or more canister, comprising:
   receiving, with one or more of a remote controller device, a Point-of-Sale device, and a remote management entity, information indicative of details of a purchase transaction for the purchase of one or more substantially full propane canisters by a purchaser and of a return of one or more substantially empty propane canister;
   transmitting, with the one or more of the remote controller device, the Point-of-Sale device, and the remote management entity, signals indicative of the details of the purchase transaction to a system controller, the details comprising a number of substantially full canisters to be removed and a number of substantially empty canisters to be returned;
   determining, with the system controller, location of inventory of propane canisters within one or more cabinet system to fulfill the purchase transaction, each cabinet system comprising:
      a cabinet controller in communication with the system controller;
      a cabinet having a first compartment separated from a second compartment, the first compartment having a first door and the second compartment having a second door, the first door and the second door having an open position and a closed position with a locked state and an unlocked state;
      a human-machine interface in communication with one or more of the system controller and the cabinet controller;
      one or more unit detection device in communication with the cabinet controller for monitoring removal of substantially full propane canisters from the cabinet and placement of substantially empty propane canisters in the cabinet;
   determining, with the cabinet controller, a presence of the purchaser proximate to the one or more cabinet systems;
   transmitting, from the system controller through the cabinet controller to the human-machine interface of the one or more cabinet systems, instructions for the purchaser as to the location of propane canisters to fulfill the purchase transaction based at least in part on the determined location of inventory of propane canisters;
   detecting, with the unit detection device, a presence of a substantially empty propane canister;
   transmitting, from the unit detection device through the cabinet controller to the system controller, signals indicative of the return of the substantially empty propane canister in the first compartment of one of the cabinets;
   transmitting, from the system controller to the cabinet controller, a signal indicative of instructions to change one or the first door and the second door from the locked state to the unlocked state;
   detecting, with the unit detection device, a removal of a substantially full propane canister from the cabinet of the cabinet system; and
   updating, with the system controller, the location of inventory of propane canisters, based on the detection of the return of the substantially empty propane canister and the removal of the substantially full propane canister.

8. The method of claim 7, wherein the one or more cabinet systems is two or more cabinet systems.

9. The method of claim 7, wherein detecting, with the unit detection device, the presence of a substantially empty propane canister further comprises detection of a placement of the substantially empty propane canister in the first compartment of the cabinet.

10. The method of claim 9, wherein detecting is based at least in part on weight of the canister.

11. The method of claim 10, further comprising:
determining, with the unit detection device, an amount of weight removed from the cabinet; and
calculating, with cabinet controller, a number of canisters removed based on the determined amount of weight removed and on a predetermined weight range of substantially full canisters.

12. The method of claim 7, wherein detecting, with the unit detection device, the presence of a substantially empty propane canister further comprises detection of the substantially empty propane canister proximate to the cabinet.

13. The method of claim 12, wherein detection is based at least in part on use of one or more of a camera and a LiDAR device.

14. A system for semi-automated distribution of one or more canister, comprising:
a remote controller device;
a remote display in communication with the remote controller device;
one or more cabinet systems, each cabinet system comprising:
a cabinet controller in communication with the remote controller device;
a cabinet having a first compartment separated from a second compartment, the first compartment having a first door and the second compartment having a second door, the first door and the second door having an open position and a closed position with a locked state and an unlocked state;
a human-machine interface in communication with the cabinet controller;
a unit detection device monitoring removal of substantially full propane canisters from the cabinet and placement of substantially empty propane canisters in the cabinet, and transmitting signals to the cabinet controller indicative of the removal and the placement; and
a system controller in communication with the cabinet systems, the remote controller device, and the remote display, the system controller having one or more non-transitory computer processor executing instructions that cause the processor to perform the following steps:
receive a data element indicative of details of a purchase transaction from the remote controller device;
receive signals from the human-machine interface indicative of entry of the data element indicative of details of the purchase transaction from a purchaser;
transmit signals to the cabinet systems indicative of instructions to change the first and second doors between the locked state and the unlocked state; and
receive signals from the cabinet systems indicative of a number of substantially full propane canisters removed from the cabinets of the cabinet systems and a number of empty propane canisters placed in the cabinets of the cabinet systems.

15. The system of claim 14, wherein the remote controller device comprises a remote Point-of-Sale device.

16. The system of claim 14, wherein the remote controller device comprises a remote management entity.

17. The system of claim 14, wherein the unit detection device comprises one or more weight sensor.

18. The system of claim 14, wherein the unit detection device comprises one or more camera.

19. The system of claim 14, wherein the unit detection device comprises one or more LiDAR device.

20. The system of claim 14, further comprising a remote management entity in communication with the one or more cabinet systems, the remote controller device, and the system controller.

* * * * *